United States Patent [19]

Rutledge et al.

[11] Patent Number: 5,802,473
[45] Date of Patent: Sep. 1, 1998

[54] AUTOMATIC DETERMINATION AND TUNING OF PICO-CELL TOPOLOGY FOR LOW-POWER WIRELESS SYSTEMS

[75] Inventors: Philip Antony Rutledge, Ottawa; Jin Kue Wong, Nepean; Roland A. Smith, Nepean; Kasper Reinink, Nepean, all of Canada

[73] Assignee: Northern Telecom Limited, Montreal, Canada

[21] Appl. No.: 586,694

[22] PCT Filed: Jun. 7, 1995

[86] PCT No.: PCT/CA95/00328

§ 371 Date: Jan. 26, 1996

§ 102(e) Date: Jan. 26, 1996

[87] PCT Pub. No.: WO95/35004

PCT Pub. Date: Dec. 21, 1995

[30] Foreign Application Priority Data

Jun. 10, 1994 [GB] United Kingdom ............. 9411665

[51] Int. Cl.$^6$ ................................... H04Q 7/00
[52] U.S. Cl. ............... 455/441; 455/450; 455/456; 455/67.1; 455/67.4; 455/226.1; 455/226.2
[58] Field of Search .................. 455/33.1, 33.2, 455/33.3, 33.4, 446, 447, 450, 455, 456, 422, 507, 517, 524–525, 67.1, 67.4, 226.1, 226.2, 436, 437, 438, 439, 442, 444, 449; H04Q 7/00

[56] References Cited

U.S. PATENT DOCUMENTS 5,175,867  12/1992  Wejke et al. ............. 455/67.1
5,212,831   5/1993  Chuang et al. ............. 455/450
5,425,076   6/1995  Knippelmier ............. 455/67.1
5,465,390  11/1995  Cohen ............. 455/446
5,613,205   3/1997  Dufour ............. 455/440
5,625,889   4/1997  Chikkaswamy et al. ............. 455/67.1
5,640,414   6/1997  Blakeney, II et al. ............. 455/436

FOREIGN PATENT DOCUMENTS 0268375    5/1988  European Pat. Off. ......... H04Q 7/36
0593298A3  4/1994  European Pat. Off. ......... H04Q 7/04
WO93/15591  8/1993  WIPO ............. H04Q 7/04
WO 94/00931  1/1994  WIPO ............. H04B 15/00

*Primary Examiner*—Tommy P. Chin
*Assistant Examiner*—Vu Le
*Attorney, Agent, or Firm*—Jean-Pierre Fortin

[57] ABSTRACT

A method of using the existing radio resources to automatically determine the current cellular topology is described. Wireless basestations are placed into a mode where they can transmit a signal which can be received by all of the base stations in range of the transmitting basestation. Each base station in the system serially broadcast a signal which is received by all other basestations within the range of the transmitting basestation. Each of the receiving radios determines the RSSI (Received Signal Strength Indication) at which they received the transmitted signal. The RSSI values are used to determine which base stations are physically co-located into cells and then determine the relative locations of the cells to each other.

13 Claims, 10 Drawing Sheets

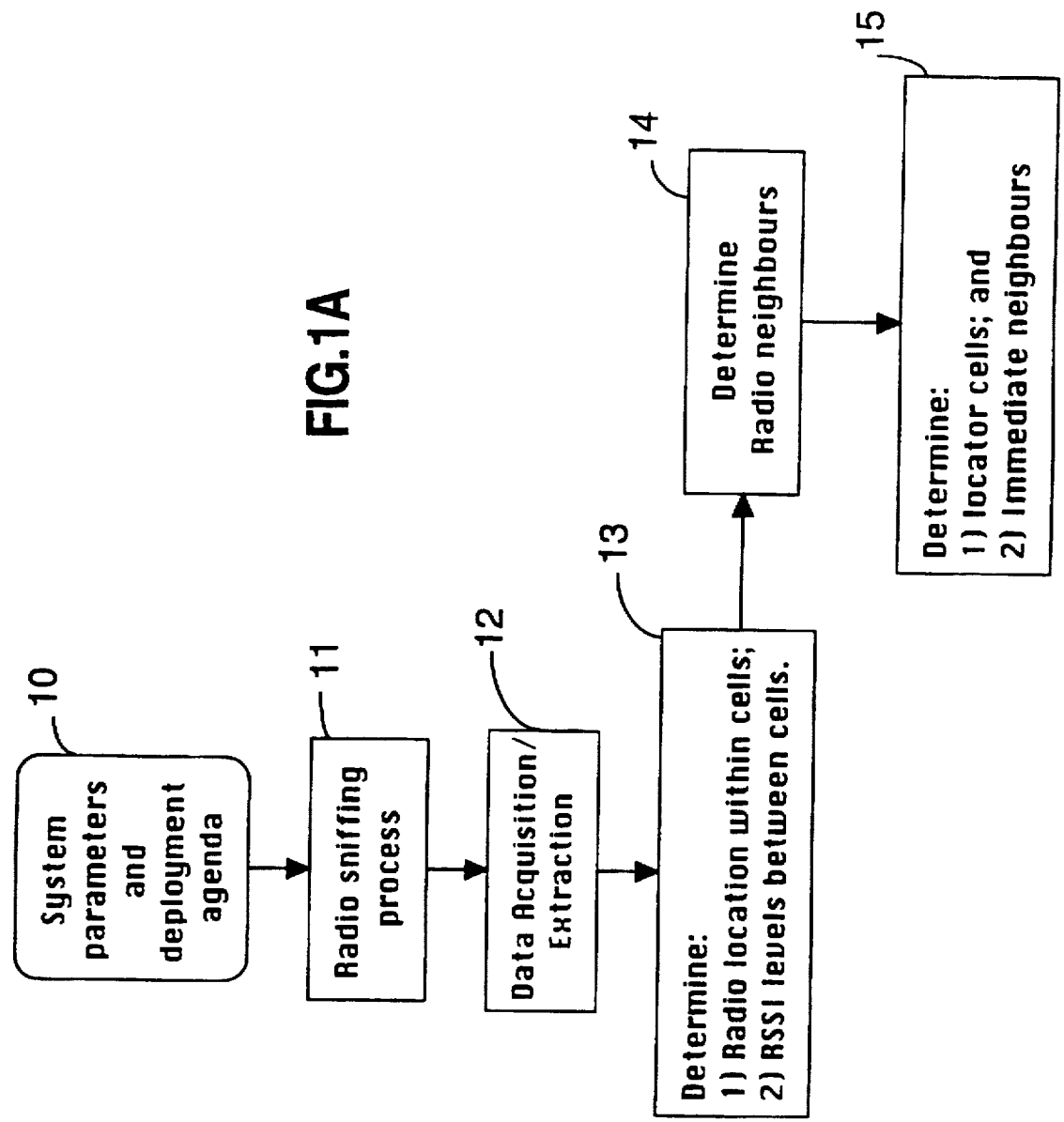

| CELL # | RADIO NEIGHBOURHOOD |
|---|---|
| Cell 1 | (Celli, RSSIi), (Cellj, RSSIj) |
| Cell 2 | (Cellm, RSSIm), (Celln, RSSIn |
| Cell 3 | (Cellp, RSSIp)    ------- |
| ------- | ------- |
| Celln | (Cell, RSSIi) |

FIG.6

| CELL # | IMM CELL NBRHD | RADIO NBRHD |
|---|---|---|
| Cell 1 | (Celli, RSSIi), | (Cellj, RSSIj) |
| Cell 2 | (Cellk, RSSIk), (Cellm, RSSIm) | |
| Cell 3 | (Cellp, RSSIp) | (Celln, RSSIn) (Cello, RSSIo) |
| ------- | | |
| Celln | (Cellq, RSSIq), (Cells, RSSIs) | (Cellt, RSSIp) |

FIG.7

Cell included in the scope    Cell not included in the scope

AUTOMATIC DETERMINATION AND TUNING OF PICO-CELL TOPOLOGY FOR LOW-POWER WIRELESS SYSTEMS

BACKGROUND OF THE INVENTION

This invention relates to low-power wireless systems and more particularly to pico-cellular wireless systems which make use of co-located zones to permit mobility traffic.

DESCRIPTION OF THE PRIOR ART

A pico-cellular wireless system is composed of a number of wireless radio base stations which are distributed throughout a coverage area. To make effective use of these radio resources the radio base stations are physically co-located into zones of coverage known as cells. Such a pico-cellular wireless system is disclosed in applicant's co-pending application entitled "Low-Power Wireless System for Telephone Services" and having Ser. No. 07/961,769, now abandoned.

In order to provide effective wireless service in this wireless environment, an understanding of the topology of the cellular configuration is necessary. Once an understanding of the cells is in place, operations such as mobility handoff and portable location can be made to operate the system more efficiently.

In current wireless systems the manual deployment process determines the most effective placement of the wireless basestations. For example, radio base stations are placed according to estimate of traffic densities at specific locations. Once this process is complete, the grouping of radio base stations into cells must be manually entered into the system through the administration interface. That is, there are instances where two or more base stations may be required in the same zone to provide service in an area with a higher than expected traffic density. Also the information detailing the location of cells with respect to each other must be determined and entered into the system.

The cell concept allows radio channels in the allocated spectrum to be re-used provided that the cells are sufficiently far enough apart to prevent their signals from interfering. The cell concept also provides a mechanism for efficiently locating portable terminals since only one radio in the cell need be actively engaged in the search process.

This type of wireless system requires knowledge of the cell patterns in order to efficiently perform the functions of mobility handoff, arbitration and location. For example, when a portable terminal with an active radio link is about to leave the radio coverage of a cell, the manager of that cell will request neighbouring cells to pickup the radio link. Typical cell patterns include cell membership i.e. mapping of radios to a cell, and cell relationships such is as a list of neighbouring cells for a given cell.

Initially the system is geographically laid out and hard wired manually using a portable signal strength measuring device, and moving away from a fixed base station (that is transmitting a known test signal) until the received signal strength measurement from it indicates another base station is required. After installation of this next unit, the procedure is repeated until radio coverage of the desired area (e.g.: an entire building or group of buildings) is fully achieved using this layout technique. Then the whole system is mapped manually by recording, one at a time, the signal strength measurements of the various base stations at selected distances and directions from them again using the portable signal strength measuring unit.

Presently the cell mappings can be specified using a manual administration process for which the system size is no more than 36 cells. In practice all cells are defaulted to belong to the immediate neighbour list, because the provisioning task is complex and error prone.

Since this process of manual determination of cellular topologies is both tedious and error prone, it is desirable to provide a more efficient mechanism for determining cell patterns.

Even once the cell pattern is determined, the system must still be able to perform mobility operations effectively. Wireless mobility operations are concerned with providing the best link possible at all times. This is performed by allowing the portable user to stay in communication with the cell which provides the portable with the best wireless service.

As the portable user moves through the wireless coverage area, the cell which is able to provide the best link will change and the portable user's communication link must be handed over to the new cell. As a portable user moves through the coverage area, target cells are asked if they are able to provide a service to the portable user which is better than the service offered by the serving cell. If a cell responds that it is able to provide a better quality communication link then the link is handed over to the new cell.

Since in large systems it is extremely inefficient to ask all the cells in the system if they can better support a link, system performance would be improved if only those cells which have the highest probability of better supporting the link were asked to monitor the existing link.

It is therefore an object of the present invention to provide a method of automatically determining the cellular topology of cells once the system has been hardwired during installation. Once the system is turned on it automatically initiates a testing sequence to establish the Received Signal Strength Indication (RSSI) of each radio with respect to another. As will be manifest from the following description, such a test sequence does not provide a direct indication of the signal strength between the basestations and the portable units but only between the basestations themselves. However, the information gleaned from this test sequence does establish an initial layout pattern or topology of the system that can then be dynamically modified as the system is used to provide optimum interaction between the basestations in each cell and the portable units.

Another object of the present invention is to provide a method wherein data collected during operation of the system is used to tune the operations and provide increased system performance. For example, the monitoring of the user's mobility traffic is used to determine those cells which have the highest probability of supporting a portable user's link.

SUMMARY OF THE INVENTION

It has been found that more efficient and effective control of the system can be achieved by recording base station to base station signal strength measurements (as opposed to base station to portable unit measurements) once the initial hard wired layout has been done. As will be manifest from the following description, such a procedure lends itself to automation whereas the former procedure must be manually carried out using the portable units which are transported by hand during the test. In addition updating of the system configuration can be much more effectively accomplished at regular intervals. This would be very laborious and time consuming (especially for very large systems) if done manually using portable recording equipment.

The first embodiment of the invention is a method of using the existing radio resources to automatically determine the current cellular topology. This makes the installation of a wireless system simpler and less error prone.

The key to the process is to place the wireless basestations into a mode where they can transmit a signal which can be received by all of the basestations in range of the transmitting basestation.

Each basestation in the system serially, i.e. one base station at a time, broadcast a signal which is received by all other basestations within the range of the transmitting basestation. Each of the receiving radios determines the RSSI at which they received the transmitted signal. This RSSI value is transmitted to the central controller which determines the relative locations of the basestations.

These values are used to determine which basestations are physically co-located into cells and then determine the relative locations of the cells to each other.

In another embodiment, a method is described by which the wireless system monitors the mobility traffic and uses this information to improve the operation of the system. The system operation is improved since the system determines which cells will have a high likelihood of successfully participating in a mobility operation.

The operation of this process is transparent to the wireless user. As the user uses the mobility features of the system by making and receiving wireless calls, the mobility patterns of the users are tracked and fed into an algorithm which determines and updates to the central wireless configurations.

Hence, over time the system is able to determine which cells are more likely to be involved in handover situations. As an example, during wireless handover, a number of surrounding wireless cells may be asked to receive the link. However, if over a period of time it is determined that one particular cell is always successful in recovering the link, then it is given priority in the next handover phase.

BRIEF DESCRIPTION OF THE DRAWINGS

FIG. 1a is a flow diagram describing some of the steps used to determine pico-cell topologies according to the present invention;

FIG. 6 is a table illustrating the general structure of neighbourhood lists;

FIG. 7 illustrates the cell mapping table which is used in the immediate cell neighbourhood algorithm;

PICO-CELL TOPOLOGY DETERMINATION

The pico-cell topology determination is the initial mapping of cell-radio membership and cell relationships. This process is described in the flow diagram of FIG. 1a. Once the system parameters and deployment agenda 10 are known, the system will automatically determine the cell topology. The system parameters and deployment agenda would, for example, include the number of radio base stations, the number of cells required for expected traffic densities, the physical layout of the building or location where the system is installed, etc. The next step 11 is done by initiating radio base stations to enter a sniffing mode, that is each radio in the system will in turn broadcast while the other radios listen and measure signal strength. The data collected at 12 is analyzed according to specified parameters and radio location algorithms to provide the radio location within cells and RSSI levels between cells, as shown at block 13. From this information, the radio neighbours are established at step 14. From the radio neighbour information, the locator cells and immediate neighbours, step 15, can then be determined. The resultant analysis of all RSSIs is used to determine the cell patterns.

Figure 1B:
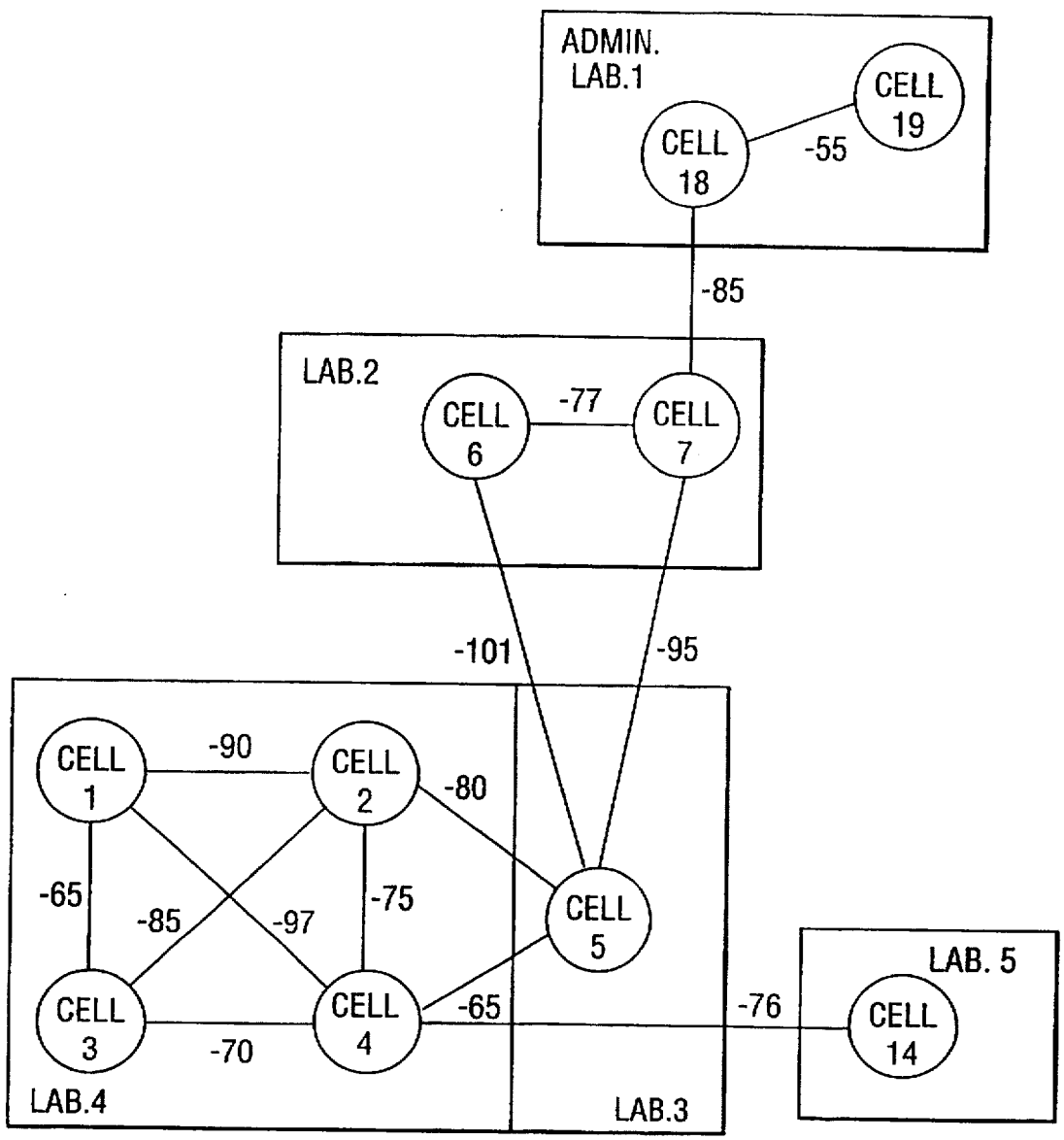
FIG. 1b shows an example of a pico-cell topology layout with relative RSSI readings between cells.

An example of a typical cell layout analysis is shown in FIG. 1b. For simplicity, only a representative sample number of cells are illustrated for the various sections of the building complex which comprises an Administration section "Admin" and several Laboratory sections labelled Lab 2, Lab 3, Lab 4 and Lab 5. As indicated above, although the physical location of the cells for each area of the building is a known parameter, their interaction as a group isn't and can thus affect the overall operation of the system. Knowledge of that interaction improves the efficiency of the system.

The RSSI data is acquired by a Radio Interface Module (RIM) in the basestation during the base station's sniffing process, whereby each radio in the coverage zone broadcasts a set of code words to all receivers. A typical base station architecture is described in applicant's co-pending application entitled "Low-Power Wireless System for Telephone Services" and having application Ser. No. 07/961,769.

A RSSI sample is obtained for each address or data code word that is able to be decoded. The sniffing process provides a framework via which RSSI samples may be obtained for different channels (frequencies), antenna combinations, and signal power levels. The results which are recorded in the standard –dBm format are shown for adjacent cells of the network. For instance the recorded level between cell 1 and cell 2 is –90 dBm while that between cell 6 and cell 7 is –77 dBm. Such illustrated results would be typical of the received power at the receiving basestation in one cell, from the transmitting basestation in another cell with a power output of either 0.25 mW (low power) or 10 mW (high power).

Figure 2A:
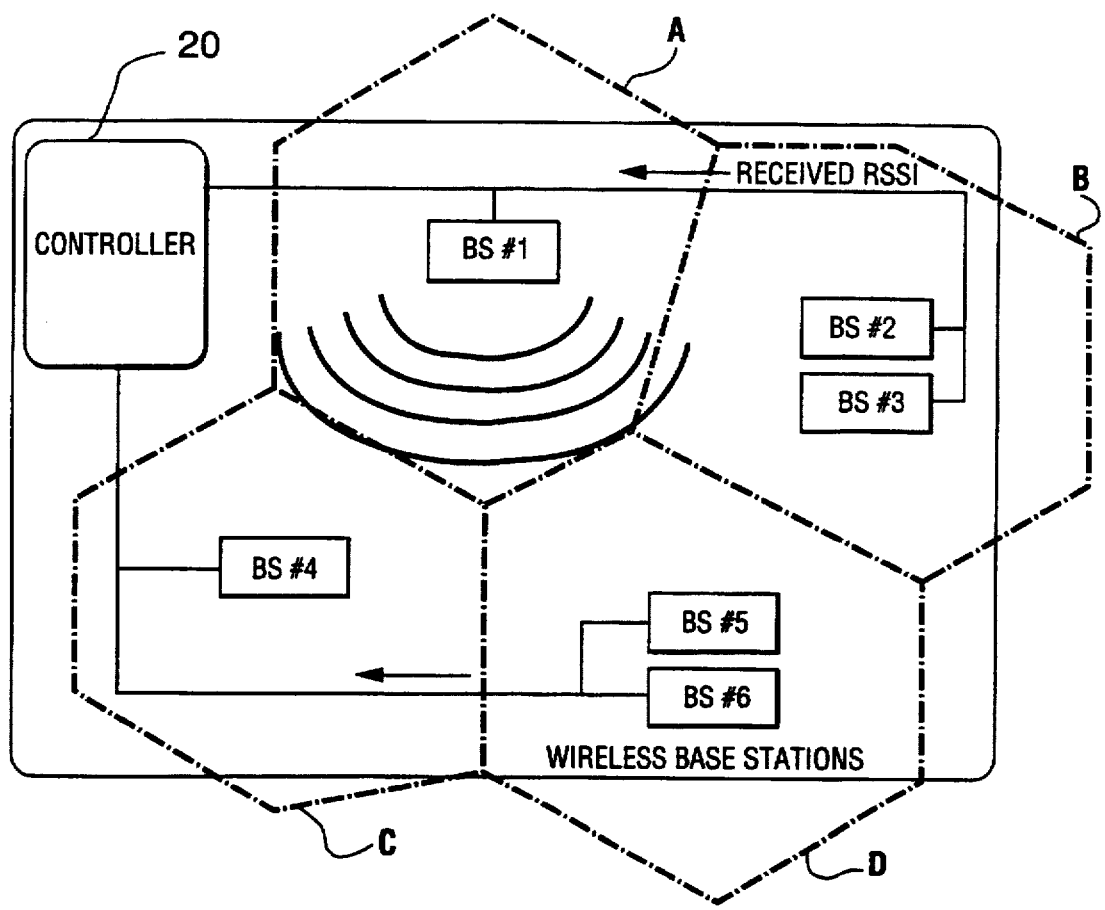
FIG. 2a is a diagram illustrating the initial mapping scenario of cell radio memberships and cell relationships.

For example, in FIG. 2a, base station BS #1 has been chosen as a transmitter. This transmitter basestation radiates a specified signal which is then received by all the receive basestations BS #2 and #3 in cell B, BS #4 in cell C, and BS #5 and #6 in cell D, in range of its transmissions. Each of these receive basestations reports the RSSI of the signal that they received. Once the data transmitted by base station #1 has been collected by all receiving basestations, another base station becomes a transmitter and the process is repeated for all the basestations in the system. To obtain better statistical data, the data can be repeated on different frequencies, antennas, etc. Once all basestation transmissions are complete a controller 20, to which the basestations BS #1 to BS #6 are connected, processes this data and is then able to determine the cellular configuration.

During operation, the mobility software in the system's wireless controller 20 requires knowledge of cell relationships as part of its call processing function. Once the RSSI measurements have been obtained from the sniffing process, the cell relationships can be extracted. The cell relationships are:

Co-located radios within the same cell

Immediate cell neighbourhoods

Radio cell neighbourhoods

Locator cell regions.

Figure 2B:
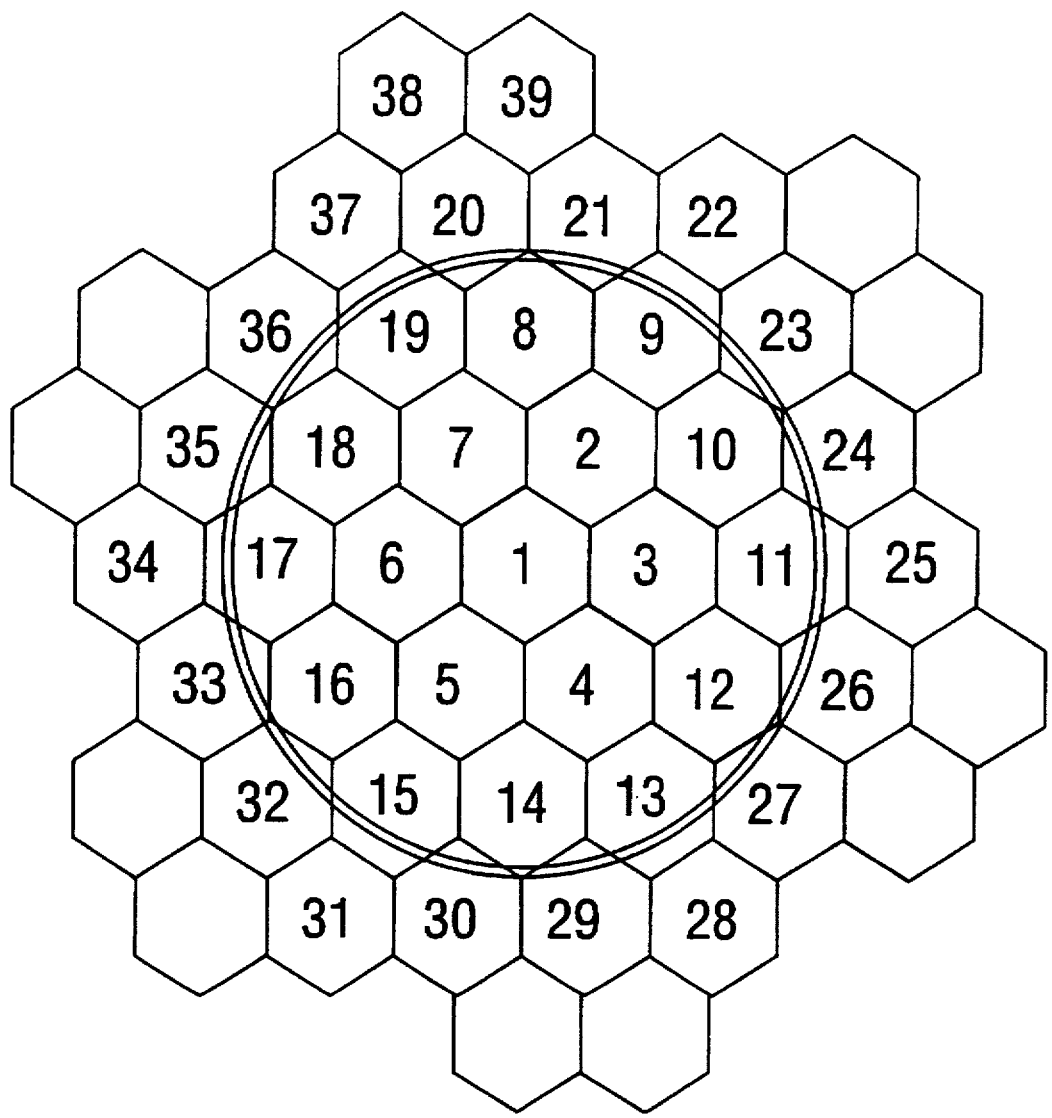
FIG. 2b shows a typical cell community structure.

In FIG. 2b, we have shown a typical cell community structure used in providing a wireless service. For convenience of illustration, the cells are portrayed as hexagonal areas, where in actual fact the boundary of a cell is defined as a line beyond which the propagation or powers of a radio link is deemed to be too weak to maintain communications. In the present invention, we introduce the terms immediate neighbours and radio neighbours. With respect to cell 1 of FIG. 2b, the immediate neighbours are cells 2,3,4,5,6 and 7. These are cells which share a common region or volume of operational traffic cell overlap, wherein mobility handoffs can occur therebetween. The radio propagation neighbours, cells 2–19 inclusive, are cells wherein one or more radio base stations might receive or see a radio link from a portable even though the cell may be completely disjointed in terms of an operational traffic cell.

As indicated above, the mobility software in the systems wireless controller 20 requires knowledge of cell relationships as part of its call processing function. With the system of the present invention, a cell membership list is used to specify the radio members of each cell. Knowledge of co-located radios improves performance and saves system resources. Since all radios within a given cell behave similarly in terms of radio coverage and average RSSI, only one radio in the cell need be assigned to execute a particular function e.g. lost portable search. For example, in FIG. 2a, both cell B and D have two radio base stations. Accordingly, since each is likely to behave in the same way, only one is assigned for a task to eliminate duplication.

The immediate neighbour list specifies for each cell its adjacent cells.

Knowledge of immediate neighbours enables efficient usage of system resources when performing hand-off functionality. The immediate neighbours are the best candidates to pickup the radio link for the mobile portable.

The radio neighbour list specifies for each cell those cells for which radio contact can be detected.

Radio neighbour lists are applicable to call setup arbitration. Links may be established anywhere between portable and radio within a radio's coverage. The purpose of arbitration is to select the cell with the best possible coverage to the portable and this is performed by requesting all radio neighbour cells to "sniff" or report the signal strength to the portable. The radio link is handed off to the winning cell.

The locator local area list specifies the cell members of each local area.

Delivery of incoming calls to a portable terminal requires that the portable be located within the radio coverage area. In systems operating within the CT2Plus version of the Common Air Interface (CAI) standard, the wireless coverage area is comprised of a set of local areas and the portable's location is tracked on a per local area basis via Common Signalling Channel (CSC) signalling. Each local area consists of one or more cells, and the cell relationships are used as input to determine the local area composition. In addition, knowledge of minimum cell regions required to exhaustively search through the wireless coverage area is useful when the portable location is unknown in a large system and a global search is required to deliver an incoming call.

An example of a radio link architecture making use of CSC is described in U.S. Pat. No. 5,229,995 which is issued to applicant.

The topology determination or cell mapping is completed upon the analysis of the RSSI data collected by each radio during the sniffing process. Upon extraction of the RSSI data, two broad functions are performed. These processes are resident in the Line Interface Module (LIM) in the basestation.

The RSSI samples are subject to noise, and a filter process is used to obtain a mean value for the RSSI level.

Multipath fading and antenna radiation patterns may affect the signal strength, so that a measurement vector must be compiled from the RSSI samples when the transmission bursts are repeated using different channels, antennas and power levels (diversity).

The next step is a classification function which uses measurement vectors together with a set of cell pattern rules and constraints to generate a number of mappings that include radio-cell memberships, immediate cell neighbours, radio neighbours and locator areas. Then, a Cell Database Function, implemented via the Community Data Server, maintains the cell lists in its internal database and distributes these for use during operation of system features such as Cell Managers for handoff/arbitration and the Locator for portable terminal searching.

The Radio Interface Module (RIM), Line Interface Module (LIM), Community Data Server, Cell Managers and Locator sub-systems mentioned above, are described in applicant's co-pending application entitled "Low-Power Wireless System for Telephone Services" and having application Ser. No. 07/961,769.

As indicated above, the radio-cell memberships and cell neighbour mappings are determined using the RSSI data provided by the base station sniffing process.

In the ideal case the RSSI measurements derived from sniffing fall into three categories: colocated radios, immediate radio(cell) neighbours, and radio neighbours.

In practice a number of factors affect the RSSI measurement:

Raleigh or multipath fading.

The RSSI vector between two radios is critical since the signal coverage of a radio must be inferred from the signal strength measured at a single point by another radio. (Recording the signal at other radios as is done in base station sniffing, and correlating the measurements can reduce the criticality of the RSSI measurement for the reference radio). Since the radio-cell memberships and cell neighbour mappings are essentially determined from the RSSI vector measured between radios it is essential to eliminate any interference components in the RSSI; for example a too low RSSI reading between two co-located radios due to fading may wrongly result in their being allocated to two different cells.

External radio source interference.

It is necessary to understand the accuracy of the base stations RSSI measurement process and factor in the RSSI error range when classifying the radios into cells and deciding cell relationships.

Inaccuracies in the RSSI measurement process.

Figure 3:
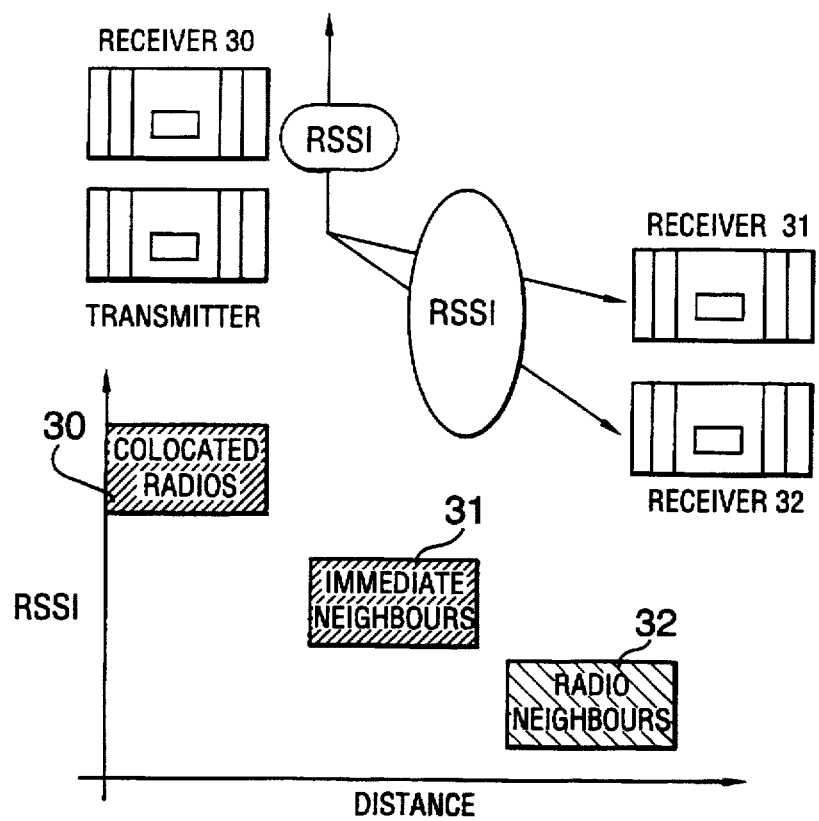
FIG. 3 illustrates how graphs can be derived of the RSSI as a function of distance.

In an ideal case, graphs can be derived of the RSSI as a function of distance from the transmitting radio in order to determine the RSSI thresholds for collocated radios, immediate and radio neighbours. This is illustrated in FIG. 3. Thus, those radios receiving the strongest signals would be the colocated radios 30. Those receiving the second strongest signals would be the immediate radios 31 and those with the weakest signals would then be radio neighbours 32.

Antenna radiation patterns.

The RSSIs are passed through a normalization process so that the cell relationship algorithms can be applicable to product applications with for example different power levels.

RSSI Measurements

Figure 4:
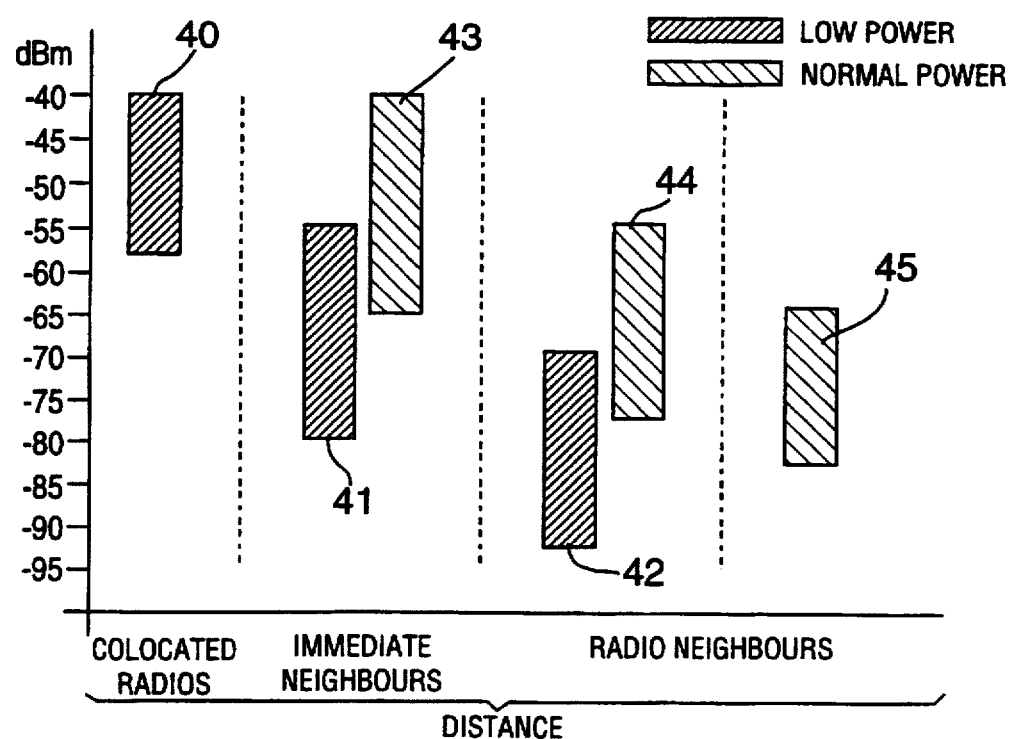
FIG. 4 illustrates the bands obtained from RSSI measurements signifying different cell relationship.

An initial estimate is made to determine the RSSI boundaries encountered during the base station sniffing process. RSSI readings are taken for co-located radios, immediate radio neighbours and tabulated. FIG. 4 illustrates the bands obtained from RSSI measurements signifying different cell relationships.

An analysis of the RSSI measurement data is required in order to determine a suitable set of Measurement Vectors to classify cell memberships and relationships.

Techniques to obtain a representative RSSI channel measurement include:

Filtering

Space diversity

Frequency diversity.

During the sniffing process the transmitter broadcasts a signal at low or normal power levels. The signal strength samples measured at the radio receivers are subject to noise interference. In the sniffing scenario the transmitter and receiver are always at constant distance from each other, and the signal is repeated periodically by sending ID_OK and Data code words alternately. Ideally, the frequency response of this signal is a single impulse in the frequency domain. The presence of noise can be reduced by applying a low pass filter to remove any higher frequency components.

Assuming that the mean value of the noise component is zero then the following averaging function is applicable:

$$\frac{\sum_{j=-k}^{k} Xj}{2k+1} = \bar{x}$$

To reduce the impact of asymmetrical interference the following algorithm is used:
1. Collect RSSI samples during 180 msec collection period for given power and antenna combination;
2. Maintain the peak HI and LO value through collection period;
3. Exclude the peak HI and LO values from sample space; and
4. Calculate mean value of RSSI samples.

Code words sampled by the RIM are divided into good and bad code words based on whether or not the Cyclic Redundancy Check (CRC) is valid. A separate count is also kept of the number of codewords received that contain a "bad" Portable Identifier (PID) or Link Identifier (LID).

External interference and/or low signal strengths can cause bit errors in the sampled code words.

For purposes of comparing two averaged RSSI values a sufficient number of good code words must be collected e.g. a RSSI average of −45 dBm based on 2 samples would not be selected over a RSSI average of −50 dBm based on 20 samples.

RSSIs are divided into two categories for comparison purposes (total 24 samples):
RSSI mean values based on 16 or more samples (66%).
RSSI mean values based on less than 16 samples. The sample threshold will be defined as a system parameter and config tag.

The RSSI measurement bands in FIG. 4 can be divided into three main regions for evaluating cell mappings:

1. Low power levels 40 that register RSSI values within saturation mode (−40 dBm region) are used to decide whether or not radios are co-located.
2. Low power levels 41 and 42 that register RSSI values not in saturation mode indicate cell mappings of immediate- or radio neighbours. In this region both normal and low power levels should indicate RSSI levels that differ by approximately 16 dB. It is expected that the RSSIs sampled at normal power 43, 44 and 45 are more to be relied on than those sampled at low power in the presence of interference.
3. The final region consists of radio neighbours that are detectable in normal power mode 45 but generate poor/no low power RSSIs.

Since co-channel interference is not a factor in the sniffing process it is desirable to use the normal power transmission for determining immediate and radio neighbours cells. Increased signal strength also reduces the effects of fading.

Figure 5:
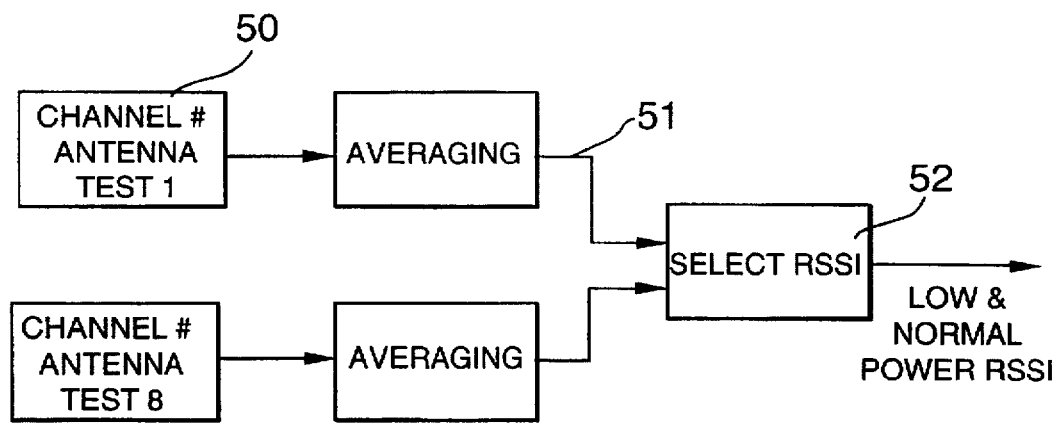
FIG. 5 shows a block diagram for illustrating the basic algorithm for extracting the RSSI between two base stations.

The block diagram of FIG. 5 can be used to illustrate the basic technique for extracting the RSSI between two base stations.

Two vectors are required: one at low power and one at normal power:
1. A set of RSSI samples is measured for each antenna combination and frequency channel e.g. eight sample sets are generated by using internal antennas plus two frequency channels (0-0, 1-0, 0-1, 1-1 over two channels). The recorded measurements at 50 include:
Sum of RSSI values for good code words.
Number of good and bad code words.
Peak hi and peak lo RSSI values.
Mean RSSI over 200 msec when the number of good codewords is zero.
Number of bad PID/LID codewords with correct checksums.
2. Each RSSI sample set is averaged by excluding the peak hi and peak lo values, and dividing the sum by the number of good codewords (51).
3. The best RSSI of the averaged samples sets is selected based on RSSI strength and number of samples (52).

In practice, each radio in the system is only able to detect N other radios, so that a linear neighbourhood array can satisfy storage of RSSI readings. The data structure reflects the clustering effect of mutual radio detection.

Retaining RSSI data in reduced form has the advantage that the "colocation radio" algorithm can perform multiple passes through the entire set of data to determine the best fit with respect to radios and cells. Assigning radios to cells in serial fashion as messages containing RSSI readings arrive from the radios saves memory, but provides for only a single pass through the data making it difficult to backtrack (such as when it is found that the number of cells required exceeds the system capacity).

Two sets of RSSI readings can occur between two radios of adjacent base stations. The strongest RSSI value is selected to represent signal strength between the two radios.

Three types of averaged RSSI values are provided by the basestation (see APPENDICES A and B):

RSSI of Matching Codewords:

This value is representative of the signal strength between two radios since the transmitter codewords were correctly decoded at the receiver.

RSSI of Bad Codewords:

Codewords containing CRC and parity errors were received. High RSSI values probably indicate the presence of an external noise source, whereas low RSSI values would indicate a weak link and/or external noise i.e. the radios are far apart.

RSSI No Codewords:

In the event of no codewords being detected, the RIM obtains the average RSSI value on the sniffing selected frequency channel. The use of external slicing by the RIM provides for better decoding. These RSSI samples provide the ability to detect radios that are located far apart. (When non-matching PID/LID codewords are detected with zero matched PID/LID codewords then the Cordless Fixed Part (CFP) Server will reattempt the sniffing sequence since another colocated system is transmitting concurrently).

For algorithmic purposes the RSSI is considered to consist of two elements in order to interpret and select the best sample: RSSI type and RSSI value.

As indicated above, in general the RSSI data may be grouped into three bands (FIG. 4):

1. Saturated RSSIs in the region of −44 dBm at low and normal power corresponding to colocated radios.
2. RSSIs corresponding to the immediate neighbouring radios of a transmitter at normal power: since the distance between basestations may vary significantly from 10–40 meters, RSSIs may range from −55 dBm to −80 dBm at normal power.
3. RSSIs corresponding to non-immediate neighbouring radios may or may not be detectable depending on the basestation distance, level of external noise and radio barriers.

The variation in RSSI values means that the RSSI analysis should be done on the basis of relative rather than absolute values e.g. select immediate neighbours based on the best 10 RSSIs detected.

The table of RSSI values shown in Appendices A and B shows a sample set of measurements for a number of radios, for both low and high powered base station transmitters.

Once the RSSI measurements have been obtained from the sniffing process, the cell relationships can be extracted. A set of system parameters is specified to be used by the other algorithm components e.g. the RSSI threshold that defines whether or not two cells are to be considered as immediate neighbours. The system parameters serve to:

Normalize the RSSI readings so that the cell algorithms are still functional if the system parameters are altered e.g. power levels.

Fine tune the system via simulation and testing to derive a set of parameter values that generate optimal cell neighbourhood lists.

Using as input a set of normal- and low power RSSI readings between radios, the co-located radios are determined by searching for saturated mappings between radio pairs. The algorithm returns a list of radios associated with each cell.

The RSSI input is extracted from the sniffing data as specified by the data extraction algorithm described above. The extraction algorithm will have selected the strongest normal- and low power RSSI reading between two radios from multiple RSSI sample sets (see Appendices A and B).

Once the cells have been specified for the system then the radio neighbourhood algorithm compiles a sorted list of cells that are in radio contact with each other. Sample data is shown in Appendix C.

A single representative RSSI between two cells is calculated.

Each cell owns a list of neighbours for which radio contact has been detected sorted in order from strongest to weakest signal.

Using the radio neighbourhood list, the immediate cell neighbourhoods can be determined by selecting those cells that exhibit the strongest signal strengths with respect to a reference cell.

Finally, a set of cell regions for locator searching can be derived when the number of cells in the system is known, as well as their neighbourhood relationships.

Co-located Radio Determination

We can now take a closer look at each algorithm which analyses the RSSI data. The first is the colocation algorithm which determines which radios belong in the same cell. The identification of co-located radios is determined by the following properties:

RSSI Saturation

Co-located radios exhibit close-to saturated RSSI readings with respect to each other at low power.

RSSI Similarity

All radios within a cell behave similarly in terms of radio coverage (RSSI strength) with respect to other radios in the system. Determination of colocated radios in a cell is a critical section of the overall algorithm since once the radio-cell assignment has been performed, the radio-cell mappings cannot be changed by the Ongoing framework. Reassignment may only occur during the re-evaluation process (all call processing needs to be stopped during this phase).

The colocation algorithm uses the RSSI Saturation property to assign radios to cells.

An objective of radio to cell assignment is to place all radios in the system into cells. If it is found during the assignment process that the number of cells required exceeds the system capacity then the colocation properties are relaxed to meet the above goal: first the RSSI Similarity condition is excluded and then the colocation threshold value is increased incrementally. The Colocate-Radios algorithm assigns radios to cells making use of the RSSI saturation and similarity checks between radios. The first part of the algorithm assign two radios with saturated RSSI readings to the same cell; the second part ensures that two radios with non-saturated readings are placed in separate cells.

Parameters

A number of parameters need to be defined before describing the algorithm. These are:

Maximum Cells

Maximum cells supported by the wireless system.

Colocation Threshold

The minimum RSSI value between two radios at which the two radios are considered to be colocated in the same cell.

Colocation Neighbourhood Range

The minimum RSSI strength between a colocated radio pair with respect to a third radio in the system in order to determine whether or not each radio in the colocated pair shows similarity to the third radio in terms of signal strength.

Colocation Neighbourhood Delta

The tolerance level allowable for a colocated radio pair to show similarity with respect to a third radio in the system.

Colocation Threshold Increment

The Colocation Threshold incremental increase when the number of cells required by the Colocation Algorithm exceeds the system capacity.

The colocated radio assignment algorithm is shown in Appendix D:

Radio to Cell Alignment

The routine shown in Appendix E attempts to place radios in original cells prior to re-evaluation.

Verification that a given radio is at saturation with respect to all radios in cell is as shown in Appendix F.

Colocated radios in a cell (that detect each other during basestation sniffing) can be obtained from the RSSI-Matrix low power radio members and Radio-Cell Matrix. Refer to Appendix A.

The routine for adding radio pair B1 and B2 Add__B1__ B2__to__cell checks that both radios are using internal antennas. In this case both radios must indicate close to saturated RSSI samples and the best RSSI is selected.

Radio Neighbourhoods

The radio neighbourhood algorithm compiles a list of radio neighbourhood cells for each cell in the system. The radio neighbourhoods are generated using the RSSI Table (basestation to basestation RSSI) and the colocated radio mappings (cell to radio). The neighbourhood cells are placed in sorted order from strongest to weakest RSSI.

The table shown in FIG. 6 illustrates the general structure of the neighbourhood lists. Each radio neighbour consists of two elements:

1. Cell Id
2. RSSI type

Algorithm Outline

The radio neighbourhood algorithm shown in Appendix G compiles the neighbourhood list.

Immediate Cell Neighbours

The radio neighbourhood algorithm compiles a list of immediate neighbourhood cells for each cell in the system. The immediate cell neighbours are determined by selecting those cells with the strongest RSSI signal strength with respect to the reference cell. The Radio Neighbourhood table contains a sorted list of cell neighbours.

On system startup and as part of a reevaluation process the system in conjunction with the sniffing process compiles lists of colocated radios, immediate neighbours and radio neighbours.

As will be described later, the immediate-and radio neighbourhood lists may be modified as the system learns more about the mobility patterns in the radio network e.g. cells that commonly perform handoff. The system has the capability to both add and remove cells from the neighbourhood lists.

The strategy adopted incorporates the above property to compile immediate neighbourhood lists that are robust in meeting radio coverage requirements at the expense of adding extra cells.

This strategy reduces the probability of dropped calls during handoff when there is no cell to take-over the call.

Monitoring cells involved in handoff and arbitration over a period of time enables the neighbourhood lists to be optimized by removing redundant cells—it is simpler to remove redundant cells from the neighbourhood lists than to add the appropriate cell that solves a handoff problem caused by missing radio coverage.

To meet the radio coverage requirements, the compilation of immediate neighbourhood lists attempts to take into account the following:

Selecting neighbouring cells with the strongest RSSI signals to the ref cell.

Providing connectivity between all cells

Radio barriers.

The immediate neighbourhood list is a subset of the radio neighbourhood list shown in the above table. Each cell maps to a set of cells that consists of cell identifier and RSSI.

The immediate neighbourhood size is a function of the cell coverage and traffic impact: it is desirable to provide good handoff coverage using a large neighbourhood list, but limit the traffic impact cause by requesting large numbers of cells to sniff a portable at frequent intervals.

It is noted that the selection of the best immediate neighbours is determined by the relative RSSI values rather than absolute RSSI values. The distance between cell centres and consequently their RSSIs may vary between system installations—from 10 m to 40 m.

The Immediate Neighbourhood algorithm assumes that in general, installation of radio basestations in an office is performed in a manner so as to provide contiguous wireless coverage i.e. it is possible to define a handoff path from any one cell in the system to any other cell. Although separate "islands" of wireless coverage may well be implemented, the Immediate Neighbourhood algorithm will add extra cells (provided radio detection is found to occur between two cells) to ensure connectivity—on the basis that it is simpler for the Ongoing Framework to remove redundant cells than to add a missing cell.

The algorithm function is specified as follows:

A cell zone concept is defined that consists of all cells that together provide contiguous wireless coverage i.e. it is possible to move from any one cell in the cell zone to another cell maintaining immediate neighbourhood RSSI strength.

Scan through the cell mapping table (FIG. 7) and combine all immediate neighbourhood cells into one cell zone. Repeat until all cells in the system have been assigned into one or more cell zones.

If two or more cell zones have been generated then attempt to combine two cell zones by selecting the strongest RSSI between a cell in the first cell zone and a cell in the second cell zone (the RSSI must be greater than the connectivity threshold level). Repeat for all cell zones.

When the distance between base stations is large then it is possible that only the immediate cell neighbours are detected from a given cell. Thus the radio neighbourhood is equivalent to the immediate cell neighbourhood.

In this case the radio neighbourhood for a given cell can be expanded by inclusion of the immediate cell neighbours of the cell's immediate neighbours.

The three components of the Immediate Neighbourhood algorithm serve to generate a neighbourhood list that is complete in terms of mobility:

Selecting neighbouring cells with the strongest RSSI signals provides the initial cell mapping coverage for handoff.

The connectivity component attempts to combine groups of cells to provide large areas of contiguous wireless coverage for mobility (cell zones).

The associative component attempts to "fill-in" holes of wireless coverage within the cell zones caused by radio barriers within the area.

The immediate neighborhood radio algorithm parameters are as follows:

Immediate Neighbourhood Size
Maximum number of immediate cell neighbours per cell.
Immediate Neighbourhood Threshold
The minimum RSSI value between two cells for which the two cells are considered to be immediate neighbours of each other.
Connectivity Threshold
The minimum RSSI value between two cells in two different cell zones for the cell zones to be merged by inclusion of the two cells in immediate neighbourhood lists.
Associative Threshold
Cell_associate algorithm is invoked if the number of immediate cell neighbours is less than the associative threshold.
Algorithm Outline
The structure in the table of FIG. 7 depicts the immediate cell neighbourhood algorithm: selecting appropriate cells from the radio neighbourhood for the immediate cell neighbourhood.

The CELL# in the table of FIG. 7 is referred to as the reference cell.
The immediate cell neighbourhood algorithm outline is shown in appendix H:
Selecting cells on an RSSI basis is shown in Appendix I, while selecting cells on a connectivity basis is shown in appendix J:
Adding immediate neighbours using the associative algorithm shown in Appendix K when the cell neighbourhood list contains few cells.
Expanding the radio neighbourhood of Appendix K is shown in Appendix L.
Locator Cell Regions
For purposes of incoming call delivery the Locator is responsible for searching the wireless coverage area to determine the location of the portable terminal. The Locator currently uses three methods of location tracking:

1. Local Registration (LR) on a Common Signalling Channel (CSC) beacon—the movement of the portable from one local area (a group of cells) to another is tracked.
2. Implicit Registration (IR) uses radio link activity within the coverage area such as link originations and releases to track the portable on a per cell basis.
3. Global Search—when the location of the portable terminal is not known to the Locator then a global search must be performed over all cells in the system. Applicant's co-pending patent application entitled "... provides a description of the Locator algorithms.

The Locator performs several passes to search for the portable: on the first pass the LR local area is used, on the second pass the LR local area and IR cell, and on subsequent passes a global search is executed.
The global search item is of interest within the domain of system.
To perform global search the Locator does not request all cells in the system to search for the portable—in order to comply with CAI standards requirements (e.g. max of seven different radio channels over all base stations can be used simultaneously per call setup) and traffic interference within the system itself (e.g. Functional Message Protocol (FUMP) queuing delay) the cells in the system are subdivided into a number of cell regions.

The Locator requests all cells within a cell region to search for the portable terminal at one time. If the portable is not found then a search is performed in the next cell region, and so on.

Although all cells in the system are covered by specified cell regions, the global search time can be improved by populating the regions with a set of cells that maximize the probability of locating the portable within the first or second pass.

In addition, the cell regions are only to be populated with cells that own radios.

The following rules govern the choice of selecting cells for a cell region:

A cell with multiple immediate and radio neighbours within the base station sniffing context is a good candidate for the cell region since this cell will be positioned "centrally" (as opposed to the periphery of the wireless coverage area) within the wireless coverage area thus providing a fair degree of overlap with other cells. The detection of this cell by other cells in the system is an indication that the wireless coverage provided is sizeable.

A wider search area results when two cells in the cell region are not immediate neighbours of each other—a weak RSSI signal between two cells is an indication that the two cells are located at a substantial distance apart or that a radio barrier separates the two.

Thus the cell region should comprise cells that are widely separated from each other to cover the total wireless coverage area, where each cell has multiple immediate neighbours to indicate that it provides substantial coverage within the cell's domain.

The Locator algorithm which is outlined in Appendix M and its application is best suited for large cell systems:

Automatic Administration of Cell Topology

With respect to the second embodiment of the invention, the system can tune the pico-cell topology by monitoring the mobility traffic to provide more efficient mobility services. As indicated above, wireless mobility operations are concerned with providing the best link possible at all times. This is performed by allowing the portable user to stay in communication with the cell which provides the portable with the best wireless service.

As the portable user moves through the wireless coverage area the cell which is able to provide the best link will change and the portable user's communication link must be handed over to the new cell. Specific cells are asked if they are able to better provide service to the portable user than the cell that is currently in communication with the portable. If a cell responds that it is able to provide a better quality communication link then the link is handed over to the new cell.

The process of querying cells to determine if they can better provide service consumes system resources and hence better overall system performance can be obtained if this querying process is performed efficiently.

The process described here provides a method wherein the monitoring of user's mobility traffic can be used to determine those cells which have the highest probability of supporting a portable user's link. The wireless system monitors the mobility traffic and uses this information to improve the operation of the system. The system determines which cells will have a high likelihood of successfully participating in a mobility operation.

The operation of this process is transparent to the wireless user. When the user operates the mobility features of the system by making and receiving wireless calls, the mobility patterns of the users are tracked and fed into an algorithm to determine updates to the central wireless configurations.

Hence, over time it is possible to determine which cells are more likely to be involved in handover situations.

For example: during wireless handover a number of surrounding wireless cells may be asked to receive the link, however if over a period of time it is determined that one particular cell is always successful in recovering the link then it is given priority in the next handover phase.

Figure 8:
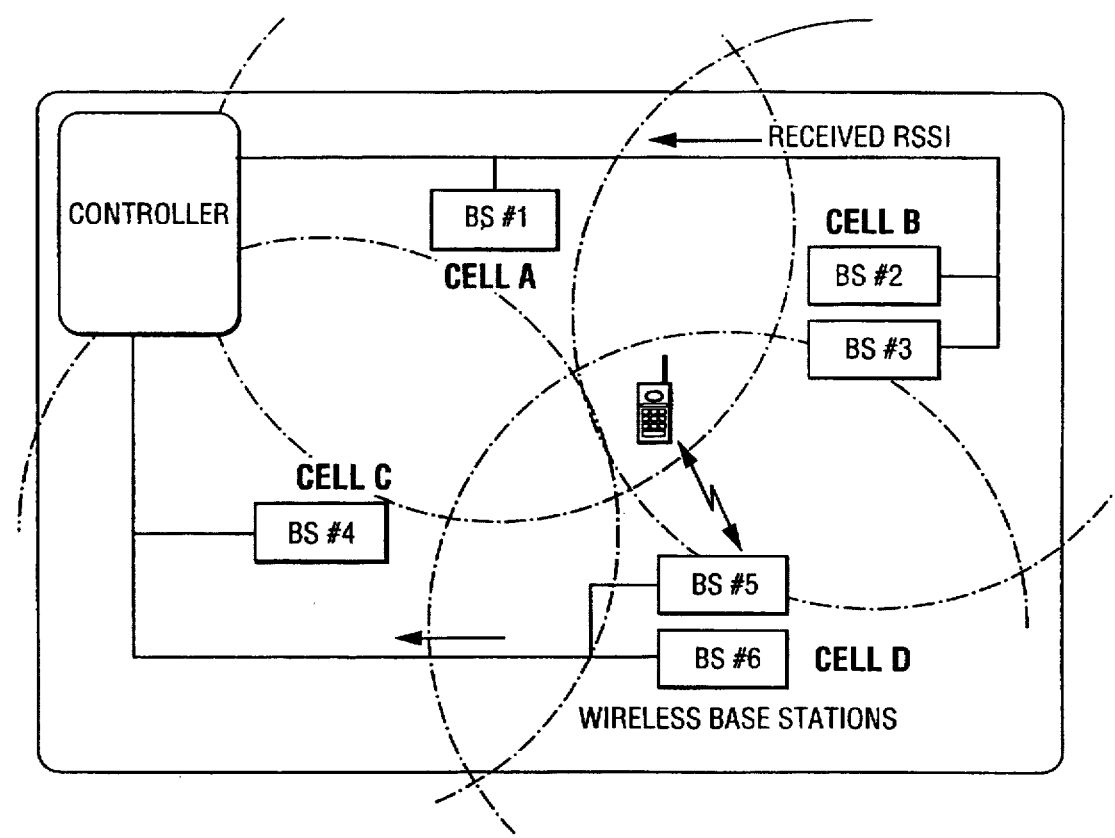
FIG. 8 is a diagram illustrating the cell tuning scenario according to the second embodiment of the invention.
Figure 10:
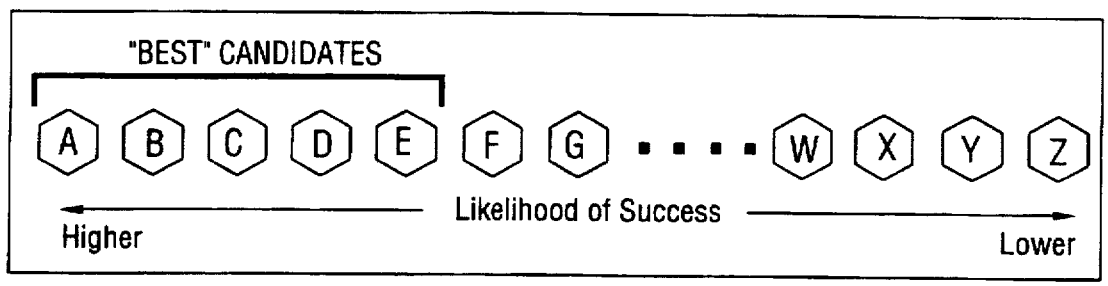
FIG. 10 illustrates the cell selection process according to the prior art.

Referring now to FIG. 8, the system layout of FIG. 2a is also shown. Here it can be seen that the user is in communication with Cell D, however the user's radio transmissions can be seen by both Cell A and Cell B. From this information the central controller can determine that Cell A and Cell B have coverage areas near Cell D. This information will be used to optimize the handover process.

The steps performed during the basic learning or automatic administration (autoadmin) cycle form a continuous loop. For example, as the system performs an operation (defined below), feedback as a result of the operation from the cellular environment is obtained. The feedback is then assessed and used to tune the operation.

Figure 9:
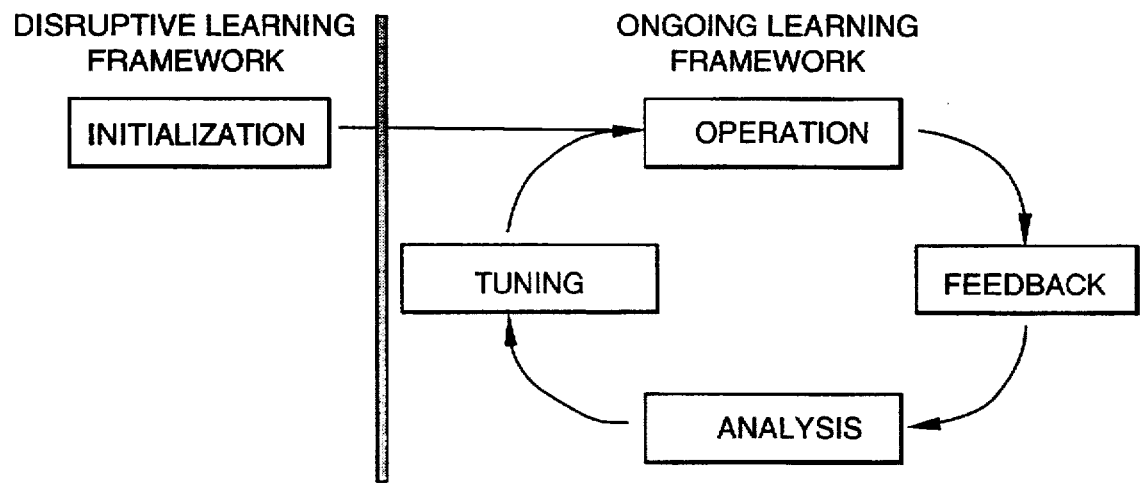
FIG. 9 illustrates the ongoing learning framework lifecycle.

This is generally illustrated in FIG. 9.

The kind of wireless operations that can be used in tuning or as sources for feedback data are:

arbitration mobility handoff portable location on Switch Originated Link Setup (SOLS); Common Signalling Channel (CSC) selection lost portable search portable registration Local Area (LA) determination; etc.

The above operations are defined in applicant's co-pending application entitled "Low-Power Wireless System for Telephone Services" and having application Ser. No. 07/961,769. Most of these operations involve selection from or searching through many candidates for a suitable one.

The nature of the feedback data obtained from these operations is of two types:

1. We know from the results of the operation whether it was successful or not, and when it was successful which candidate was successful. This allows us to build up a history of successful winners of the various operations which we can analyze statistically.

2. Each operation usually involves the reporting by cells (radios) of various RSSI values encountered. Because we know the context of the operations, we can use the RSSI values to build a view of the system environment. In particular we are interested in determining topological and topographical relationships between cells. We can refer to this as the RSSI space view of cells. These relationships are important because they are considered to be the dominant factors in whether a candidate (cell) is likely to be successful for an operation. As can be seen, this RSSI space view of the world is independent of the particular operation.

The nature of RSSI measurements which can be used to determine relationships between cells (or radios) are:

Base station sniffing: if specially programmed, radios can be used to receive the broadcasts of other radios. By looking at how each radio sees each other we can obtain a matrix of RSSI values. These values can be used to group radios into cells, and to determine initial radio and immediate neighborhoods for cells; and Portable sniffing: RSSI of portables as seen by various radios at the same time can be used to determine radio coverage relationships between the radios. In particular we can deduce the following: radio neighborhoods, immediate neighborhoods, overlapping coverage, etc.

The automatic administration of the mobility operating data is a continuous process. The lifecycle of the autoadministration feature can be seen as: At the time of the mobility initialization or re-initialization an initial determination of the mobility data will be made, this data is then used in the execution of the mobility operations. This initial learning is made possible by the disruptive learning framework.

As the system is running additional mobility events will occur. From each of these mobility events data can be obtained and analyzed. The results of this analysis will result in the updating of the mobility data. Thus the system is constantly learning, each mobility operation provides additional insight into the configuration of the system. This continuous learning is provided through the ongoing learning framework.

In the existing wireless system, the scope of a mobility operation (for a particular cell) is determined by those cells responding to a request for this operation. The message requesting the operation is addressed to the Logical Address (LAD) associated with the operation (for the particular cell). The set of target cells, who must register to receive messages addressed by this LAD (and the sets corresponding to other LADs associated with other operations and cells), is contained in a system data base called the Community Data Server (CDS). Cells affected are informed by the CDS when modifications are made to the CDS data base.

Changes to the scope of a mobility operation can thus be made by modifying the data in the CDS. The CDS must then inform the cells corresponding to the change in scope to either register or deregister against the LAD for the operation with the changed scope.

A centralized framework is thus possible where data from every operation is gathered together in one system entity, analyzed (in another possibly distinct system entity), and the new scope instituted by modifying the content of the CDS.

Figure 11:
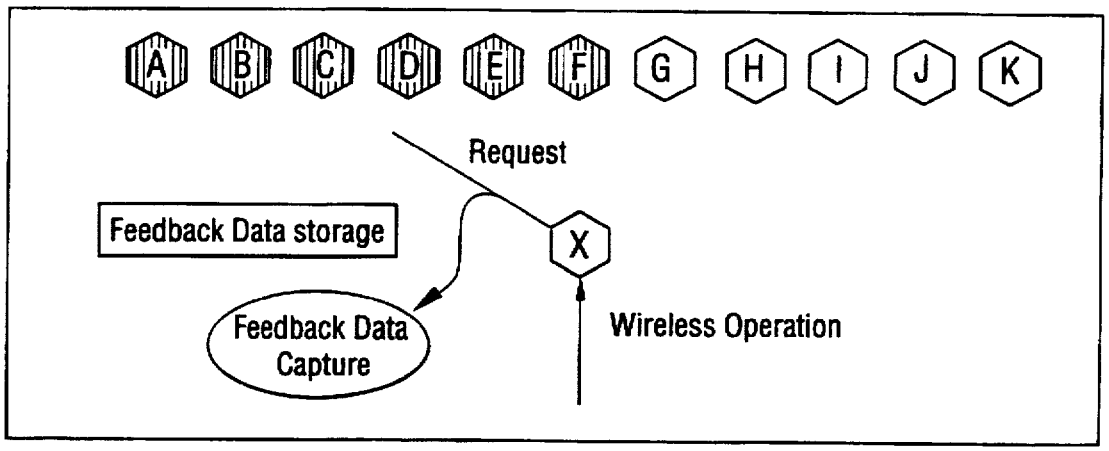
FIG. 11 illustrates the cell operation request scenario.
Figure 12:
FIG. 12 illustrates the feedback data capture scenario.
Figure 12:
Figure 12:
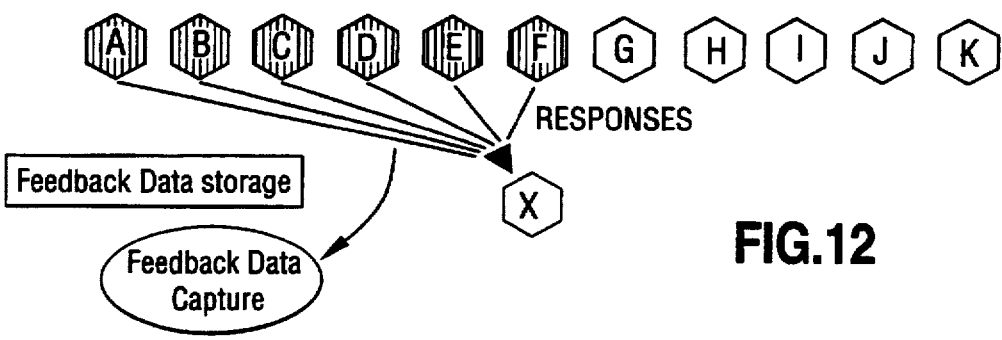

The process by which the system is used to collect and analyze the feedback data to tune the mobility operation is described in conjunction with FIGS. 10–13. Initially, certain cells are considered to be 'best' candidates for a particular wireless application. As a mobility event is received, the feedback data capture entity is notified. In the figures, the shaded cells are those included in the scope, i.e the preferred cells. In FIG. 11 for example, cells A–F are notified of an incoming request. The feedback data capture entity then observes each of the responses from the target cells. Once the data is gathered, it is passed on to the autoadmin system which analyzes it and determines the modifications to the scoping data (see FIG. 12).

Figure 13:
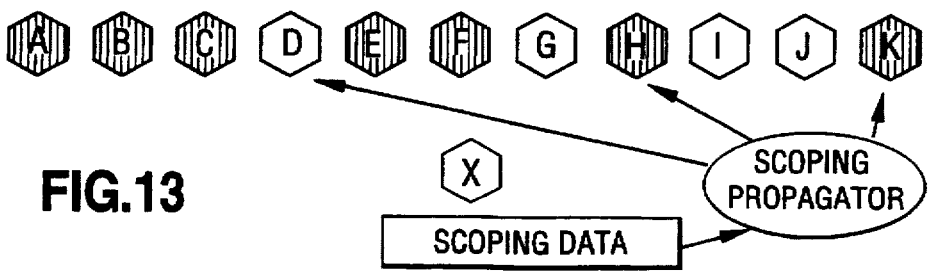
FIG. 13 illustrates the scoping scenario based on earlier feedback received.

The scoping data is then propagated to the rest of the system, as shown at FIG. 13.

We will now describe in detail the autoadmin intelligence functionality of the present invention. It consists of:

1. The disruptive or initial framework functionality (DA) which uses data gathered by the disruptive framework to determine:

the grouping of radios into cells;
   the initial immediate and radio neighborhoods of cells;
   "optimum" sets of nonempty cells "covering" the radio coverage of the system—these are used as locator regions by the locator during portable searching.

2. The ongoing framework functionality uses data gathered by the ongoing framework and lost portable recovery data to refine:

the initial immediate and radio neighborhoods of cells.

The autoadmin functionality, which will be invoked after completion of base station sniffing, is implemented as part of a CDS chain entity. Base station sniffing completes the building of a Random Access Memory (RAM) matrix of numbers in the CDS. This matrix represents processed RSSI measurements between radios in the system. Using the information provided by this matrix, the autoadmin function determines its parameters of interest and administers them into the system by interacting procedurally with the CDS database storing cellmembership, immediate and radio neighborhoods as well as locator regions. The CDS functionality will propagate this information to interested entities via its CDS change Notice messages as a side effect of these procedure calls. The Ongoing autoAdmin (OA) functionality is implemented as a background task of the CDS which will process event vectors from a RAM event vector queue in the CDS. This contents of this queue is gathered by the ongoing framework evCollector (a CDS foreground entity). During normal wireless system operation, the evCollector collects event vector messages sent from cell managers after each sniff. As well, the cell "finding" a lost portable must also report its success with an event vector message. The OA uses this information to gradually refine the definition of immediate and radio neighborhoods. Changes again are reflected into the CDS and propagated through out the system via CDSchangeNotice messages.

OVERVIEW

DA Functionality

The base station sniffing entity is best implemented as a CDS entity gathering and building the RAM base station (BS) matrix. However no matter how this done, for access efficiency, the base station matrix should reside in the CDS. (Procedural access must be made available to access this datastore.)

Upon the completion of the BS matrix build process, whatever its specifics, the Disruptive autoAdmin (DA) CDS chain entity is invoked. It uses the data in the BS matrix to determine:

the grouping of radios into cells
the initial immediate and radio neighborhoods of cells
optimized locator regions.

Upon completion it uses the CDS procedural interface to Non-Volatile RAM (NVRAM) to update these values. The BS matrix can be deallocated at this point. This storage can be reused by the ongoing automatic Administration (autoAdmin) intelligence.

It is advantageous to generalize the DA to become the only autoAdmin intelligence CDS chain entity with the following functions:

initiate the processing of BS data
update the CDS and wireless community with the resulting cell/radio relationships
initiate/suspend the ongoing autoAdmin intelligence. (i.e. in general, the autoadmin entity should control when the disruptive and the ongoing autoAdmin intelligence is allowed to operate.).

This entity would maintain the system state of autoAdmin intelligence.

OA Functionality

The event (EV) collector entity is a CDS entity which receives CDS reports of sniffing event vectors and found portable events enqueuing these events or EVs onto an unprocessed EV queue.

In the background time slice the OA is awakened to process the EV queue. EVs are dequeued from the EV queue by the OAAI. As it determines refinements to the immediate/ radio neighborhoods, it reflects these in the CDS NVRAM via procedure calls. CDSchangeNotice messages are distributed to the wireless community as side effects of these calls.

As previously alluded to the control (initiation/suspension) of the OA should reside with the CDS.

ONGOING AUTOADMIN STRUCTURE

Basic Ongoing Autoadmin Task

The structure of the basic task done by OA when invoked for a background time slice is shown in Appendix N.

A Pascal unit cdoaa will contain the bulk of the Ongoing AutoAdminIntelligence (OAAI) functionality.

OA Registration/Deregistration

The Autoadmin CDS chain entity will register and deregister the OA background task to comply with the current state of autoAdmin. OA should be registered after the running of DA. For deregistration, two possible points of time are:

upon re-eval start
upon DA start

Alternative 1 is more reasonable shutting down OA for the duration of the re-eval. This may require having the sequencer activate the cdAAI to deregister OA at the appropriate point in the re-eval sequence. The interface provided to the cdAAI will be:

```
UNIT CDOAA;
INTERFACE
        PROCEDURE oAAReg;
        PROCEDURE oAADereg;
```

These procedures will make use of the basic procedure for background task registration:
IF FUNCTION Bgrnd_Request(LowLevelBgrnd, OAA, NIL) THEN . . .

There is no need to return a return status from these routines since there is nothing that cdAAI can do about a failure. Calling oAADereg before an oAAReg is executed will have no effect. The procedures will have the effect of:

1. in the case of oAADereg, freeing OAAI RAM storage.
2. in the case of oAAReg, claiming of OAAI RAM storage and its initializing from CDS NVRAM.

This functionality makes it possible to reuse Disruptive AutoAdminIntelligence (DAAI) RAM for OAAI functionality. The mechanism for shared memory can be a pointer to a common area of allocated RAM. This shared storage should be allocated by cdAAI.

Processing Resource Throttling for OAAI

The processing resource consumption of OAAI can be limited by:

1. limiting the number of EVs that are processed during each background slice.
2. the size of the EVpool limits the number of outstanding EVs. Once the EV queue is full, we can either stop adding EVs to the queue or overwrite the oldest entries.
3. OAAI can be set to run only after every x available background slices where x is a small integer.
4. OAAI can measure its own processing and use up so many EVs per unit elapsed time.

The initial setup will assume that this activity does not require throttling. Instead, it will be awakened and consume x EVs where x is a small integer. This will be defined by the constant cEVsPerSlice. So that some experimentation can take place, the working value will be placed in a RAM VAR. The ideal method would be to place this item in NVRAM adminable via N* manager. This requires however considerable effort and overhead.

Initially this constant will be set to 10 since it is hard to imagine more than this many simultaneous sniffs completing during a single time slice.

OAAI Initialization

The question of who starts up OAAI is not a problem in the case of cold start or boot with wireless re-eval since this can be part of the oAAreg procedure called by cdAAI.

In the case however of a warm start with no wireless re-eval, there are two obvious possibilities:
1. have the OAAI register itself as part of its unit init. This must be done after the initialization of the ongoing framework. This would imply that the OAAI would check during every background time slice from the very beginning for the existence of EVs to process. There are none. In the case of re-eval required the cdAAI would deregister and reregister the OAAI as needed.
2. have the sequencer activate the cdAAI to register OAAI as a background task at the appropriate point in the warm start without re-eval startup sequence.

On first examination the second alternative appears cleaner.

Ongoing Cell to Cell Relationship Refinement

We want to refine the immediate and radio neighborhoods with the data (events) obtained from CPPsniffing and found lost portables. These will all be reported back to the CDS as event vectors to be stored in the EV queue.

With respect to each particular cell C, we would like to categorize all other cells into the following mutually exclusive types:
1. immediate neighbors
2. radio neighbors not immediate neighbours
3. others.

The list of types is ordered from "highest" to "lowest" in the order specified above.

Figure 14:
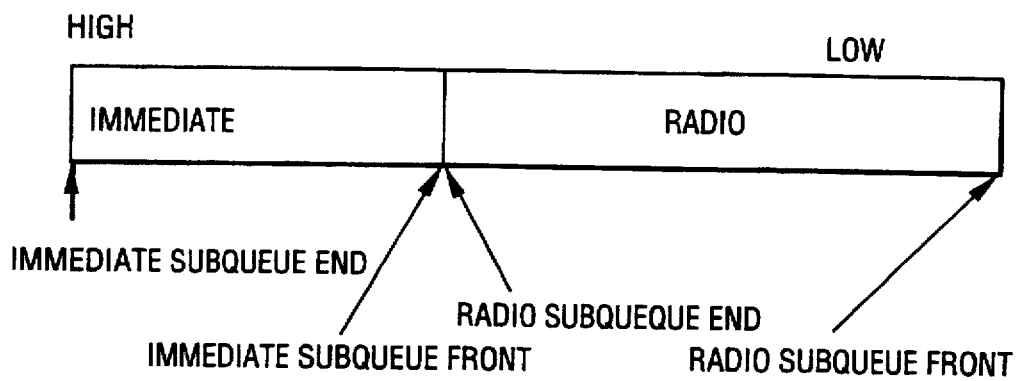
FIG. 14 illustrates a contiguous subqueue of cells in the network.

The strategy is to place a cell in the "highest" type for which it qualifies. A cell qualifies if there is evidence from (reasonably recent) information gathered that the cell belongs. We can think of each of these types as a number of subqueues joined front to end. (Refer to FIG. 14). The most recent cell is added at the end of the appropriate subqueue (the "highest" end). The oldest member is the "lowest". The front of a "higher" queue joins into the end of the next "lower" queue. The subqueue for the "others" is not kept in storage.

The general strategy then is:

---
Using Information in the EV
   FOR each cell A whose status in the queue for some cell C
      is improved by info in the EV DO
   BEGIN
      reposition cell A in queue for cell C
      WHILE any subqueue of cell C exceeds its max length DO
         dequeue the front member of this subqueue; and
         enqueue it onto the next lower subqueue if any.
   END

---

Effect of the Lapse of Time on the Value of Evidence

The idea here is that new/recent information is more important than older information. This means that unless there is recent reinforcing evidence to maintain a cell's position, there is a natural tendency for the cell to migrate gradually downwards toward the low end. As new "performing" cells are moved in or up, older cells are displaced towards the low end.

Effect of Sizing of Subqueues

If the maximum lengths of the subqueues are optimized to correspond to the estimated size of such cell categories (with some margin for variation), it can be seen that even cells which perform infrequently will stay in their proper type category. This is because other cells will not perform better.

The above strategy of course assumes that number of cells turning up in each neighborhood type is a reasonable load on the system. This seems to be the case from our current experience and will be checked during system test and engineering.

The exact numbers must be tuned by experimentation during engineering. Alternatively, we can make the queue length self tuning by looking at the "reasonably active" portions of each queue, shrinking the queues to eliminate inactive members and enlarging them if new members are added. This option will not be pursued in this initial implementation.

Immediate Neighbors

A cell is an immediate neighbor if it can succeed in a handoff as an immediate neighbor. The most useful list of cells to categorize as immediate neighbors are all and only those cells which have succeeded as candidates for mobility handoff. This evidence allows a cell to be put at the end of the immediate neighbor queue.

Radio Neighbors

A cell is an radio neighbor if it can succeed in a handoff as an radio neighbor. The most useful list of cells to categorize as radio neighbors are all and only those cells that have succeeded as candidates for arbitration handoff but not for mobility handoff. This evidence allows a cell to be put at the end of the radio neighbor queue only if the cell is not already in a higher level (i.e. an immediate neighbor).

Proven Neighbors vs Candidate Neighbors

To capture and maintain the "correct" set of neighbors, a set of reasonable candidates for neighborhood membership must be selected continuously. The mechanism selected for this initial implementation for doing this candidate selection is reported RSSI relationship with the cell C (not necessarily from sniffs for operations for cell C). Another mechanism which will add to the list of candidates will be cells successful in "finding" portables lost from cell C. This latter mechanism gives all cells a new chance to compete. (i.e. "a new lease on life").

Candidates as well as proven cell neighbors must continue to prove themselves or they will be eventually culled out over time by better peers.

Figure 15:
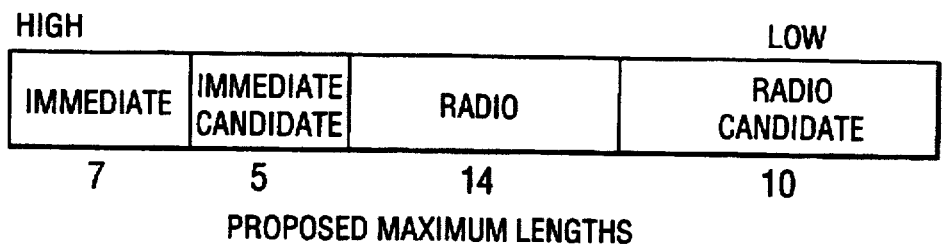
FIG. 15 illustrates in greater detail the subqueue shown in FIG. 14.

We can consider the candidates as two additional subqueues (see FIG. 15). This doubles the number of subqueues.

Immediate Neighbors Candidates (RSSI Immediate Neighbors)

We can split the category of immediate neighbors into the proven and candidate subqueues. For instance those cells which overlap with cell C at a sufficiently high RSSI level can be considered candidate cells.

Immediate neighbors who do not perform over time become immediate neighbor candidates.

Figure 16:
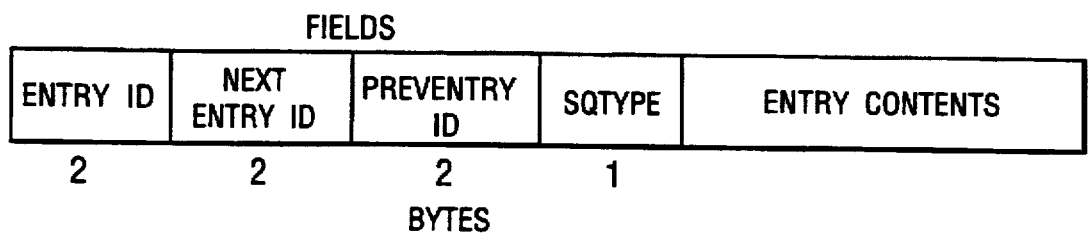
FIG. 16 illustrates in detail the entry layout of the subqueue shown in FIG. 14.

The numbers in FIG. 16 indicate initial estimates of subqueue lengths.

Radio Neighbors Candidates (RSSI Radio Neighbors)

Similarly, we can split the category of radio neighbors into proven and candidate subqueues. For instance those cells which overlap with cell C for any radio coverage can be considered candidates.

Radio neighbors who do not perform over time age to become radio neighbor candidates.

Lost Portable Cells

Cells successfully finding lost portables from cell C should be considered an immediate neighbor candidates. Since a full scale search is the final choice in a lost portable search this allows the possibility of new candidates.

Random Candidates

A possible way of introducing new candidates is to randomly or systematically poll from those not already participating. If we do this by small sampling, the likelihood of success is probably slight because there is no reason for this. This being the case it is suggested that we omit the possibility in this implementation and instead use lost portable searches as a way of introducing new "blood".

Effects on Mobility and Arbitration Sniffing of Subqueue Changes

To sniffing cells there is no difference between an immediate neighbor or an immediate neighbor candidate. Similarly, there is no difference between a radio neighbor or a radio neighbor candidate. Moves between the major categories of immediate, radio and "not in any" subqueue are referred to as major subqueue changes. Major subqueue changes are reflected as side effects into the CDS which then informs the affected cells.

This adds the following implication to the general strategy:

---
IF a major subqueue change occurs THEN
    the CDS is updated
        with the side effect of an accompanying CDSchangeNotice.

---

If we wish to be efficient about these CDS updates, we should do a block update only after some interval (the most obvious interval being the time slice). This optimization will not be done for the initial implementation.

OAAI Process EV Algorithm

The form of the algorithm is now clear. To the general strategy, we need to add the specifics of what will cause a repositioning. There are two cases:

1. CPP sniffing RSSI vector
2. found lost portable event.

CPP Sniffing RSSI Vector

There are two subcases here:

1. Scan the RSSI vector for the highest reported RSSI. The cell W reporting this highest RSSI is presumed to be winner either of a mobility handoff sniff or an arbitration sniff. The cell C is the cell requesting the sniff. The winning cell W is enqueued onto the immediate or radio subqueue of C (depending on the nature of the sniff it has won) if this repositioning improves its current status.

2. Examine all pairs of RSSIs from the vector.

If both RSSIs in a pair are above the proper cell boundary value and A and B are the cells reporting these values, then reposition A onto the end of the immediate candidate subqueue of B and vice-versa. Either repositioning of course taking place only if the cell's status is improved. The argument for this is that both cells see a portable at high RSSI and therefore their proper radio coverage must overlap.

If we still have a pair of reported RSSIs but not the situation above and cell A reports the higher RSSI and cell B reports the other value, then reposition A onto the end of the radio candidate subqueue of B. The repositioning of course takes place only if A's status is improved. The argument for this is that this vector indicates that we have actual evidence that switching to cell A from cell B will improve a portable's link if the portable is located in the position of the current EV.

Found Lost Portable Event

In this case the cell C is the cell which lost the portable.

The finding cell F is enqueued onto the immediate neighbor candidate subqueue of cell C if its status is improved by this.

Queue Implementation

The following is a proposal to implement the above subqueue scheme. We choose to implement the conceptual queues as real queues for the following reasons:

The queue implementation will be more processing efficient as the size of the system increases.

The queue implementation will be more storage efficient as the number of cells increases.

It is conceptually simpler to have queues implemented as queues.

SubQueue representation

The above is for each cell C, a list of four mutually exclusive queues of cells:

SubQueue Names

SQim(C)—immediate neighbors of cell C

SQimC(C)—candidates to be immediate neighbors for cell C

SQrad(C)—radio neighbors of cell C

SQradC(C)—candidates to be radio neighbors for cell C

This can be expressed more generically as:

SQcellType(C,SQType) where SQType has the following values:

SQinvalid=−1 (This indicates a cell is not valid for membership in the current set of queues. e.g. the cell C)

SQnone=0 (This indicates those cells which are not in the list of four queues above. Storage for this queue need not be allocated.)

SQim=1

SQimC=2

SQrad=3

SQradC=4

The SubQueue entry layout is shown in FIG. 16. The entryID is optional but would be useful during debugging.

The content of each entry in the queues will contain:
1. the cell id of the cell (2 bytes)
2. the time and date of the entry into the queue (4 bytes)
3. RSSI registered at this time (1 byte).

Apart from the first item all others are optional. The additional information is kept for experimental analysis only.

Maximum SubQueue Lengths

The maximum queue lengths will be set to the constants alluded to earlier. To enable some dynamic debugging change we will store the constants in some RAM VARs:

SQInIm
SQInImC
SQInRad
SQInRadC

Internal Utilities

An entryID identifies the entry for a cell in the system of queues. For a cell C and another cell Cell A:

1. the procedure SQcellContext(CcellID:cellID) sets the context to the subqueues for neighbors of cell C. All the following procedures require a cell context to be established previously.
2. the function SQof(AcellID: cellID ): SQtype returns the SQtype of the queue containing the entry for cell A. If the context is cell C entering Acell=cell C returns the value SQinvalid (=−1). This function will be implemented as a lookup table indexing the cell into its entryID if any.
3. the procedure SQentry (AcellID: cellID; VAR ASQtype: SQtype; VAR AentryID: entryID). A call to the procedure returns the SQtype of for the entry for cell A as well as the entryID of the entry for cell A. For some values of SQtype (SQinvalid and SQnone) the value of entryID returned will be the NILentry.
4. the procedure SQentryRemove (AentryID: entryID) removes the entry identified by AentryID from its queue. This is a low level procedure doing minimal checking assuming that the specified entry is in a queue. This procedure does NOT destroy the entry.
5. the procedure SQenqueue (ASQtype: SQtype; AentryID: entryID) enqueues the entry identified AentryID onto the queue identified by ASQtype.
6. the procedure SQdequeue (ASQtype: SQtype; VAR AentryID: entryID) dequeues from the queue identified by ASQtype placing the entry if any in the VAR AentryID. IF the queue is empty NILentry is returned. The procedure does NOT destroy the entry.
7. the function SQlen (ASQtype: SQtype) returns the length of the identified queue.
8. the function SQentryCreate: entryID returns a new entryID if there are still entries left in the pool otherwise NILentry.
9. the procedure SQentryDestroy (AentryID: entryID) returns the entry back to the pool.
10. the procedure SQentryWrite (AentryID: entryID;AentryContents: entrycontents). A call to this procedure enters AentryContents as the contents for AentryID.
11. the procedure SQentryRead (AentryID: entryID;VAR AentryContents: entrycontents). A call to this procedure returns the entrycontents for AentryID.
12. the procedure SQnextEntry (Aentry: entryID; VAR nextEntry: entryID). This procedure given the next entry if any in the queue.
13. the procedure SQprevEntry (Aentry: entryID; VAR prevEntry: entryID). This procedure given the previous entry if any in the queue.

The above utilities should be used to write the procedure moveEntry (AcellID:cellID; ASQtype:SQtype; AentryContents: entrycontents) which moves AcellId from its current location to ASQtype. It also rebalances the queue lengths and calls the appropriate CDS storage commands to update the CDS neighborhood storage.

Testing Assistance

Since knowledge of the contents of the queues is vital to determining how OAAI is performing there should be a mechanism to either query the contents of the queues or have their contents periodically presented to FUMP. Possibilities include:

1. have cdAAI handle queue query calling a oAA provided utility which formats and dumps the queues onto FUMP. The query could be a form of CDSquery. This could be a request for either a total queue dump or the subqueues of a particular cell. Responses would be messages containing fields identifying the particular cell followed by the subqueue type followed by the cells of the subqueue in order. If we wish to group several subqueues of a particular cell or subqueues for several cells in a single reply message, the response message syntax would have to be more complicated.
2. have an adminable flag which enables a timer which triggers periodic FUMP dumps of the queues.

RAM VS NVRAM

Storage Issues

1. The current CDS stores immediate and radio neighborhoods as bitmaps. Do we need these bitmaps as well as the RAM queues which essentially contain the same information? (Possibility: eliminate the bitmaps and move the queues to NVRAM.) We have two choices:
   retain the existing CDS bitmaps. Add the queues in RAM. Changes to the queues cause updates to the bitmaps as side effects.
   discard the current CDS bitmaps and put the queues in NVRAM using them as the primary store for immediate and radio neighborhoods. If we choose controlled access to NVRAM through DAI or data manager primitives this could be very processing intensive. We can retain the conceptual bitmaps in the data dictionary by writing some elaborate DAI handlers.
2. The current definition of immediate and radio neighborhoods is slightly different from the that defined above in the queues: immediate neighborhoods are used for mobility handoff. Radio neighborhoods are used for arbitration. With this definition immediate neighbors are explicitly made radio neighbors. In the subqueue definitions, it is preferable that these be mutually exclusive. We can accommodate this by:
   semantically updating both bitmaps when changes to immediate neighbors occur
   change the definition of the CDS bitmaps so that two FUMP messages are sent out to address the larger coverage area instead of the one. This is the cleaner alternative from the point of view of the oAA.
3. The ordering in the queues (both semantic and temporal) is useful information that should be kept between re-evaluations and should survive warm starts. This means that upon warm restart the queues will have to rebuilt from information in the CDS. We could do this in varying degrees of accuracy:
  we could just reproduce subqueue membership from the bitmaps
  if we store temporal info in NVRAM in addition we could restore the ordering
  if we store RSSI in NVRAM info we could recover the entire queue structure
4. Both NVRAM alternatives suffer from the possibility of being in inconsistent states after a crash before a warm start.
5. Both approaches require some locking mechanism if manual admin is to be retained
6. Item 3 above is a specific instance of the more is general problem of maintaining consistency between the subqueues and the bitmaps if this approach is taken.

CDS NVRAM PROCEDURAL INTERFACE

Cell Membership

The existing interface for the manual admin submachine is not in the unit interface and given as follows:

The above procedures can be moved to the interface section of the unit cd_cellmember. The interface can be changed to provide for radios and cells specified by cfpindex and cell index rather than stationIDs Immediate/Radio Neighbors and Locator Regions All immediate and radio neighborhoods as well as locator regions are stored currently as cellmaps. The way the current cell map utilities work is through a cell map descriptor giving the defining details of the immediate/radio neighborhood/locator region structure and associated maps. The existing interface for the manual admin submachine is not in the unit interface and given as follows:

```
Unit cd_cellmember;
{*****interface for CM submachines *********************************}
{****************************************************************}
{This procedure adds a radio to a cell removing it from where it was}
{previously}
{This procedure has the side effect of sending the changeNotice message}
{to the affected radio emulator}
{****************************************************************}
    PROCEDURE CMaddRadio( cell: tStnID; {cellStationId}
        radio: tStnID); {radioStationId}
{****************************************************************}
{This procedure removes a radio from a cell.}
{This procedure has the side effect of sending the changeNotice message }
{to the affected radio emulator}
{****************************************************************}
    PROCEDURE CMremRadio( radio: tStnID); {radioStationId}
```

```
Unit cd_cellmember;
{****************************************************************}
{mechanism for generic cell map feature:}
{particular cell map TYPES are completely described by the cell map descriptor}
{all generic procedures in this unit accept cell map descriptors}
{as a parameter: this parameter determines the specific behavior of the
{procedure}
{****************************************************************}
TYPE tCellMap = PACKED ARRAY [0. . . wcMaxCell-1] OF BOOLEAN;
{storage map maps}
{from the SM indexing (ie stationId or locatorRegionId)}
{to storage index (ie cell index or locatorRegionId)}
TYPE tStorageMap = FUNCTION(SMindex: INTEGER): INTEGER;
{LAD map maps
from the storage index (ie cell index or locatorRegionId)}
{to the LAD appropriate for the blkId}
TYPE tLADmap = FUNCTION(storageIndex: INTEGER): INTEGER;
{cell map type descriptor }TYPE tCelMapDesc = RECORD
blkId: dmBlkId; {blkId for cell map block}
maxCLmaps: INTEGER; {maximum number of cellmaps in the block}
storageMap: tStorageMap; {map from SM index to storage index}
LADmap: tLADmap; {map from storage index to LAD}
```

-continued

```
CDladSelection: 0 ... 255; {CDdataSelection for LAD}
CDladListSelection: 0 ... 255; {CDdataSelection for LADlist}
END;
{******************************************************************}
{This procedure updates a particular bit of a cell map.}
{The value parameter specifies the new value}
{This procedure has the side effect of sending the changeNotice message}
{to the affected cell manager}
{******************************************************************}
PROCEDURE CLMupdCell(CONST cellMapDesc: tCelMapDesc;
clm: tStnID; {CLMindex}
cell: tStnID; {cellStationId}
value: BOOLEAN);
```

This interface can be moved to the interface section and the indices changed to internal storage indices as with cell membership.

Block NVRAM Updates

The current CDS NVRAM procedural interfaces are very inefficient with respect to processing time. They use the standard DAI/datamanager interfaces and as such access complete bitvectors for every operation. Also each bit changed results in a separate CDSchangeNotice message to the wireless community.

If we consider minimizing NVRAN updating time as critical during re-eval, these interfaces can be rewritten to handle block updates of NVRAM and to take advantage of the bulk capabilities of the existing CDSchangeNotice definition.

RAM Interface to Queues

This interface could be used by any CDS functionality which would like to update the RAM queues and the CDS bitmaps simultaneously. In particular, manual admin would need to be redone with this.

```
UNIT CDOAA;
INTERFACE
PROCEDURE oAAmove(
                   CcellID: cellID;
                   AcellID: cellID;
                   ASQtype: SQtype);
```

This procedure inserts or moves cell A in the ASQtype subqueue for cell C depending on whether cell A is not or already in a cell C subqueue.

Some obvious checks such as whether A is C are done. ASQtype should be either Im or Rad.

This procedure is clearly an interface version of the internal moveEntry procedure mentioned earlier.

APPENDIX A

| | | | | | LOW POWER | | | | | | |
| | | | | | Matching Codewords | | | | Non-Match | | Bad Codewd |
| Tx | Rx | Chnl | Fltr RSSI | Fltr RSSI | Num | Peak RSSI | Low RSSI | Avg RSSI | Num | Avg RSSI | Num | Avg RSSI |
|---|---|---|---|---|---|---|---|---|---|---|---|---|
| 104-1 | 105-1 | 12 | 102 | 53 | 32 | 51 | 52 | 51 | 0 | 0 | 1 | 52 |
| 104-1 | 105-2 | 37 | 104 | 51 | 29 | 51 | 51 | 51 | 0 | 0 | 0 | 0 |
| 104-1 | 107-1 | 12 | 102 | 84 | 33 | 83 | 84 | 83 | 0 | 0 | 0 | 0 |
| 104-1 | 107-2 | 37 | 103 | 91 | 32 | 87 | 91 | 89 | 0 | 0 | 0 | 0 |
| 104-1 | 108-1 | 12 | 100 | 100 | 0 | 0 | 0 | 0 | 0 | 0 | 2 | 100 |
| 104-1 | 108-2 | 37 | 106 | 103 | 22 | 101 | 102 | 101 | 0 | 0 | 7 | 101 |
| 104-1 | 109-1 | 12 | 101 | 101 | 0 | 255 | 0 | 255 | 0 | 255 | 0 | 255 |
| 104-1 | 110-1 | 12 | 105 | 83 | 29 | 81 | 82 | 81 | 0 | 0 | 0 | 0 |
| 104-1 | 110-2 | 37 | 104 | 87 | 32 | 85 | 85 | 85 | 0 | 0 | 0 | 0 |
| 104-1 | 111-1 | 12 | 105 | 78 | 32 | 77 | 77 | 77 | 0 | 0 | 0 | 0 |
| 104-1 | 111-2 | 37 | 99 | 84 | 32 | 79 | 80 | 79 | 0 | 0 | 0 | 0 |
| 104-1 | 112-1 | 12 | 105 | 80 | 32 | 78 | 79 | 78 | 0 | 0 | 0 | 0 |
| 104-1 | 112-2 | 37 | 104 | 78 | 33 | 78 | 78 | 78 | 0 | 0 | 0 | 0 |
| 104-1 | 115-1 | 12 | 100 | 78 | 33 | 77 | 77 | 77 | 0 | 0 | 0 | 0 |
| 104-1 | 115-2 | 37 | 106 | 85 | 32 | 80 | 89 | 80 | 0 | 0 | 0 | 0 |
| 104-1 | 116-1 | 12 | 103 | 88 | 29 | 85 | 85 | 85 | 0 | 0 | 0 | 0 |
| 104-1 | 116-2 | 37 | 101 | 81 | 32 | 78 | 79 | 78 | 0 | 0 | 0 | 0 |
| 104-1 | 117-1 | 12 | 101 | 71 | 32 | 70 | 70 | 70 | 0 | 0 | 0 | 0 |
| 104-1 | 117-2 | 37 | 100 | 71 | 29 | 70 | 71 | 70 | 0 | 0 | 0 | 0 |
| 104-1 | 123-2 | 37 | 97 | 97 | 0 | 255 | 0 | 255 | 0 | 255 | 0 | 255 |

APPENDIX B

| | | | | | Matching Codewords | | | | Non-Match | | Bad Codewd | |
|---|---|---|---|---|---|---|---|---|---|---|---|---|
| Tx | Rx | Chnl | Fltr RSSI | Fltr RSSI | Num | Peak RSSI | Low RSSI | Avg RSSI | Num | Avg RSSI | Num | Avg RSSI |
| 104-1 | 105-1 | 12 | 102 | 14 | 432 | 44 | 44 | 44 | 0 | 0 | 1 | 44 |
| 104-1 | 105-2 | 37 | 104 | 44 | 33 | 44 | 44 | 44 | 0 | 0 | 0 | 0 |
| 104-1 | 107-1 | 12 | 102 | 86 | 27 | 68 | 69 | 68 | 0 | 0 | 1 | 69 |
| 104-1 | 107-2 | 37 | 103 | 75 | 30 | 71 | 85 | 71 | 0 | 0 | 1 | 71 |
| 104-1 | 108-1 | 12 | 100 | 91 | 30 | 87 | 88 | 87 | 0 | 0 | 1 | 87 |
| 104-1 | 108-2 | 37 | 106 | 89 | 30 | 82 | 91 | 82 | 0 | 0 | 1 | 82 |
| 104-1 | 109-1 | 12 | 101 | 100 | 9 | 98 | 99 | 98 | 0 | 0 | 12 | 98 |
| 104-1 | 110-1 | 12 | 105 | 67 | 33 | 67 | 67 | 67 | 0 | 0 | 0 | 0 |
| 104-1 | 110-2 | 37 | 104 | 71 | 33 | 70 | 70 | 70 | 0 | 0 | 0 | 0 |
| 104-1 | 111-1 | 12 | 105 | 67 | 33 | 66 | 67 | 66 | 0 | 0 | 0 | 0 |
| 104-1 | 111-2 | 37 | 99 | 71 | 31 | 67 | 70 | 67 | 0 | 0 | 0 | 0 |
| 104-1 | 112-1 | 12 | 105 | 70 | 31 | 66 | 67 | 66 | 0 | 0 | 0 | 0 |
| 104-1 | 112-2 | 37 | 104 | 65 | 32 | 64 | 65 | 64 | 0 | 0 | 0 | 0 |
| 104-1 | 115-1 | 12 | 100 | 64 | 33 | 64 | 64 | 64 | 0 | 0 | 0 | 0 |
| 104-1 | 115-2 | 37 | 106 | 72 | 30 | 66 | 71 | 66 | 0 | 0 | 0 | 0 |
| 104-1 | 116-1 | 12 | 103 | 71 | 33 | 71 | 71 | 71 | 0 | 0 | 0 | 0 |
| 104-1 | 116-2 | 37 | 101 | 68 | 30 | 63 | 67 | 63 | 0 | 0 | 1 | 63 |
| 104-1 | 117-1 | 12 | 101 | 65 | 30 | 59 | 60 | 59 | 0 | 0 | 0 | 0 |
| 104-1 | 117-2 | 37 | 100 | 60 | 33 | 59 | 59 | 59 | 0 | 0 | 0 | 0 |
| 104-1 | 123-2 | 37 | 97 | 97 | 0 | 0 | 0 | 0 | 0 | 0 | 1 | 95 |

APPENDIX C

| | | | | | | | | |
|---|---|---|---|---|---|---|---|---|
| Cell 1: | (2, 61) | (6, 65) | (7, 79) | (8, 98) | (9, 65) | (10, 64) | (11, 61) | (12, 59) |
| Cell 2: | (1, 61) | (3, 100) | (4, 95) | (6, 60) | (7, 65) | (8, 88) | (9, 59) | (10, 70) |
| | (11, 57) | (12, 60) | (16, 84) | (17, 101) | | | | |
| Cell 3: | (2, 100) | (7, 86) | (8, 96) | (13, 69) | (14, 94) | (15, 97) | (16, 84) | (17, 74) |
| | (18, 76) | (19, 67) | (20, 91) | (21, 100) | (22, 89) | | | |
| Cell 4: | (2, 95) | (7, 93) | (15, 99) | (16, 72) | | | | |
| Cell 5: | (14, 74) | (15, 96) | (16, 95) | (17, 101) | (18, 95) | (20, 82) | (21, 64) | |
| Cell 6: | (1, 65) | (2, 60) | (7, 65) | (8, 85) | (9, 63) | (10, 73) | (11, 62) | (12, 64) |
| | (16,96) | | | | | | | |
| Cell 7: | (1, 79) | (2, 65) | (3, 86) | (4, 93) | (6, 65) | (8, 67) | (9, 81) | (10, 96) |
| | (11, 79) | (12, 84) | (13, 92) | (16, 70) | (17, 103) | (19, 94) | (22, 99) | |
| Cell 8: | (1, 98) | (2, 88) | (3, 96) | (6, 85) | (7, 67) | (9, 79) | (10, 81) | (11, 82) |
| | (19,79) | | | | | | | |
| Cell 9: | (1, 65) | (2, 59) | (6, 63) | (7, 81) | (8, 79) | (10, 61) | (11, 61) | (12, 63) |
| Cell 10: | (1, 64) | (2, 70) | (6, 73) | (7, 96) | (8, 81) | (9, 61) | (11, 73) | (12, 64) |
| Cell 11: | (1, 61) | (2, 57) | (6, 62) | (7, 79) | (8, 82) | (9, 61) | (10, 73) | (12, 59) |
| | (16,95) | | | | | | | |
| Cell 12: | (1, 59) | (2, 60) | (6, 64) | (7, 84) | (9, 63) | (10, 64) | (11, 59) | |
| Cell 13: | (3, 69) | (7, 92) | (14, 95) | (17, 99) | (18, 86) | (19, 73) | (20, 87) | (21, 95) |
| | (22,60) | | | | | | | |
| Cell 14: | (3, 94) | (5, 74) | (13, 95) | (15, 67) | (16, 68) | (17, 72) | (18, 71) | (20, 94) |
| | (21,79) | | | | | | | |
| Cell 15: | (3, 97) | (4, 99) | (5, 96) | (14, 67) | (16, 72) | (17, 89) | (18, 79) | (21, 98) |
| Cell 16: | (2, 84) | (3, 84) | (4, 72) | (5, 95) | (6, 96) | (7, 70) | (11, 95) | (14, 68) |
| | (15, 72) | (17, 73) | (18, 72) | (21, 100) | | | | |
| Cell 17: | (2, 101) | (3, 74) | (5, 101) | (7, 103) | (13, 99) | (14, 72) | (15, 89) | (16, 73) |
| | (18, 51) | (19, 99) | (20, 91) | (21, 75) | | | | |
| Cell 18: | (3, 76) | (5, 95) | (13, 86) | (14, 71) | (15, 79) | (16, 72) | (17, 51) | (19, 100) |
| | (20, 71) | (21, 70) | (22, 96) | | | | | |
| Cell 19: | (3, 67) | (7, 94) | (8, 79) | (13, 73) | (17, 99) | (18, 100) | (22, 96) | |
| Cell 20: | (3, 91) | (5, 82) | (13, 87) | (14, 94) | (17, 91) | (18, 71) | (21, 58) | (22, 71) |
| Cell 21: | (3, 100) | (5, 64) | (13, 95) | (14, 79) | (15, 98) | (16, 100) | (17, 75) | (18, 70) |
| | (20, 58) | (22, 80) | | | | | | |
| Cell 22: | (3, 89) | (7, 99) | (13, 60) | (18, 96) | (19, 96) | (20, 71) | (21, 80) | |

APPENDIX D
(Page 1)

Colocate_Radios()

Colocated radio assignment:

```
For start to end of RSSI Matrix do
    If (RSSI_Matrix(index).rssi <= colocation_threshold) then
        CELLi = Get_Cell_Membership(R/Di)
        CELLj = Get_Cell_Membership(R/Dj)
        If ( CELLi = nil) or (CELLj = nil) then
            If (CELLi <> nil) then
                result = RSSI_Saturation(CELLi, R/Dj)
            If (CELLj <> nil) then
                result = RSSI_Saturation(CELLj, R/Di)

If (result = cell_merge) then
              If (CELLi <> nil) then
                  Add_B1_B2_to_cell(CELLi, R/Dj)
              Else
                  If (CELLj <> nil) then
                      Add_B1_B2_to_cell( CELLj, R/Di)
                  Else
                      CELLk = Get_free_cell()
                      If (CELLk <> nil) then
                          Add_B1_B2_to_cell(CELLk, R/Di)
                          Add_B1_B2_to_cell(CELLk, R/Dj)
                      Else
                          Exit no cells
                      Endif
                  Endif
              Endif
         Else
```

APPENDIX D
(Page 2)

/* Cell Splitting */

If (CELLi = nil) then
   CELLi = Get_free_cell()
   Add_B1_B2_to_cell( CELLI, R/Di)
End If (CELLj = nil) then
   CELLj = Get_free_cell()
   Add_B1_B2_to_cell( CELLj, R/Dj)
End Enddo /* RSSI Matrix scan */

<u>Non-colocated radio assignment:</u>

For start to end of RSSI matrix do
   If (RSSI_Matrix(index).rssi > colocation_threshold) then
      CELLi = Get_Cell_Membership(R/Di)
      CELLj = Get_Cell_Membership(R/Dj)
      If (CELLi = nil) then
         CELLi = Get_free_cell()
         Add_B1_B2_to_cell( CELLI, R/Di)
      Endif If (CELLj = nil) then
         CELLj = Get_free_cell()
         Add_B1_B2_to_cell( CELLj, R/Dj)
      Endif
      If (CELLi = CELLj) then cell_error
   Endif
Enddo /* RSSI Matrix scan */

APPENDIX E

<u>Radio_Cell_Alignment()</u>
/* Pass 1 : - maps all cells for which no changes in radios have occurred
            - maps all newly added radios to "existing" cells */

For start to end of cell_xlat_map do
   If (curr_cell_alloc[cell_id] == True) then
     While ( not( end of radio_cell_matrix )) do
       RadioId = Scan radio_cell_matrix( cell_id )
       If (radioid <> nil) then
         RadioGetCell( radioid, prev_cellid)
         If (prev_cell_alloc[cell_id] == False) Then
           cell_xlat_map[cell_id] = prev_cellid
           prev_cell_alloc[cell_id] = True
         Endif
       Endif
     Enddo
   Endif
Enddo /* Pass 2 : map cells for which radios have moved */
For start to end of cell_xlat_map do
   If (curr_cell_alloc[cell_id] == True) then
      If (cell_xlat_map[cell_id] == nil) then
         this_cell = Get_free_cell in prev_cell_alloc map
         cell_xlat_map[cell_id] = this_cell
         prev_cell_map[this_cell] = true
      Endif
   Endif
 Enddo
/* Pass 3 : remap cellids */
Remap cellids in radio_cell_matrix

APPENDIX F

RSSI_Saturation ( CELLr, R/Dr)

For (all radios in CELLr) do
    R/Di = get next radio in CELLr
    RSSIir = RSSI_Matrix ( R/Di, R/Dr)
    If (RSSIir > Col_rd_threshold) then
        Return split_cell
    Endif
Endfor
Return merge_cell

APPENDIX G

<u>Radio Neighbourhoods()</u>

```
For start to end of RSSI_Table do
    Get basestation indices (index) => B/Si & B/Sj, RSSIij
    CELLk = Get cell (B/Si)
    CELLm = Get cell (B/Sj)        /* Basestations must be in
    If ( CELLk <> CELLm ) then         different cells */
        For CELLk in radio neighbours table:
            Scan for CELLm
            If CELLm found then
                Assign best RSSI from (RSSIij, RSSIm) and sort by rssi
            Else
                Assign CELLm to radio_neighbours list
                Assign RSSIi to radio_neighbours list and sort by rssi
            End
        End
        For CELLm in radio neighbours table:
            Scan for CELLk
            If CELLk found then
                Assign best RSSI from (RSSIi,j, RSSIk) and sort by rssi
            Else
                Assign CELLk to radio_neighbours list
                Assign RSSIij to radio_neighbours list and sort by rssi
            End
        End
End /* RSSI_Table */
```

APPENDIX H

Immediate_Cell_Neighbourhoods()

Parameters: Imm_nbrhd_size
Imm_nbrhd_threshold

Select_cells_rssi_basis(Imm_nbrhd_size,
                        Imm_nbrhd_threshold)
   Select_cells_connectivity_basis()
   Select_cells_associative_basis()
   Add_radio_neighbourhood_members()

APPENDIX I

Select_cells_rssi_basis(Imm_nbrhd_size,
                       Imm_nbrhd_threshold)

If ( total number cells <= Imm_nbrhd_size) then
   Default all cells to immediate neighbours
End For start to end of cell_mapping do
   While ((cell_mapping(CELLi).count < Imm_nbrhd_size) and
        not(end of radio_neighbour_list(CELLi))) do CELLj = Get next radio neighbour of CELLi
        If (radio_neighbour_list(CELLi, CELLj).rssi <=
                        Imm_nbrhd_threshold) then
          Copy CELLj to cell_mapping(CELLi).imm_nbrhd_list
        End
   End
End

APPENDIX J
(Page 1)

Select cells connectivity basis()

While Not( all_cells_marked) do
    Get free cell_zone
    Assign all linked immediate neighbour    cells to cell zone
End
Link cell zones Build_cell_zone (cell_zone)

Scan cell mapping table for    unmarked cell

Copy unmarked cell and its immediate neighbours to cell zone
Mark cell

Repeat until no hits
    Hit = false
    For start to end cell mapping table do
        If ((cell is member of zone) and
        (cell is unmarked)) then
        Add cell's immediate neighbours to cell zone
        Mark cell
        Hit = true
        End
    End
End

APPENDIX J
(Page 2)

<u>Link_cell_zones()</u>
While Not ( link_completed ) do
Block:
    If (number of cell zones >= 2) then
        For i from start to (end-1) cell zones do
            For j from (i+1) to end cell zones do
                Select best RSSI(cell_zone(i), cell_zone(j)) -> CELLx, CELLy
                If (RSSI(x,y) >= Connectivity_threshold) then
                      add cell_zone(j) to cell_zone(i)
                      add CELLx to immediate nbr hd list of CELLy
                      add CELLy to immediate nbr hd list of CELLx
                      Link_completed = false
                      Exit Block
                End
        End
    End
    Link_completed = true
End

APPENDIX K

Select_cells_associative_basis()

For start to end of cell mappng do
    If (cell_mapping(CELLi).count <= assoc_cell_threshold) then
        For each cell pair in neighbourhood list of current CELLi
           If (cell pair are immediate neighbours) then
               Scan neighbourhood lists of cell pair for common cell
                  If (common cell found) Then
                     add common cell to neighbourhood list of current cell
                End
              End
           End
        End
End

APPENDIX L

Add_radio_neighbourhood_members()

For each cell over cell_mapping do
    For each immediate cell neighbour of cell do
        Add immediate neighbours of immediate cell neighbour
           to cell radio neighbourhood list
    End
End

APPENDIX M

Locator cell regions()
Set bin A to empty
Place all cells* in bin B
Repeat until all cells allocated:
   Get free cell region
   While cell region not completely populated do
      If bin B is empty then
         Set bin A to empty
         Place all non-selected cells in bin B
      Endif
      Select cell in bin B with maximum immediate neighbours
      Select cell is placed in cell region
      Move select cell and immediate neighbours to bin A
   Endwhile
Endrepeat
Repeat until all regions allocated : copy above cell pattern Cells* - refers to cells that own radios

APPENDIX N

```
PROCEDURE OAA(dummy: LONGINT);
BEGIN
    WHILE EVqueue not empty DO
        dequeue EV from EVqueue
        process EV
        IF #EVs processed in this slice exceeds
            some constant integer x = cEVsPerSlice THEN terminate
    ENDWHILE
END
```

What is claimed is:

1. A method of determining the cellular topology of a cellular network, having a plurality of radio base stations connected to a central controller, comprising the steps of:

a) selecting a base station from said plurality of base stations;

b) broadcasting from said selected base station a test signal;

c) receiving the test signal at each base station located within the radio propagation range of said selected base station;

d) measuring the Received Signal Strength Indication (RSSI) level at each base station able to receive said test signal from said selected base station;

e) forwarding the measured RSSI level to the central controller;

f) repeating steps a) to e) until each base station in said plurality has been selected and until all RSSI levels have been measured; and g) determining the relative location of each base station from one another by mapping a matrix of measured RSSI levels for the corresponding radio base stations, so as to delineate the cellular bounds of the network.

2. A method as defined in claim 1, wherein said test signal is re-transmitted from each selected base station on a first, then a second frequency.

3. A method as defined in claim 1, wherein said test signal is re-transmitted from each selected base station over a first, then a second transmit antenna.

4. A method as defined in claim 1, wherein said test signal is transmitted from each selected base station at a first power level, then re-transmitted at a second power level.

5. A method as defined in claim 4, wherein said RSSI levels measured at said second higher power level are used when said test signals are received at said base stations in the presence of interference.

6. A method as defined in claim 1, wherein the step of determining comprises filtering RSSI samples to obtain a mean value of the measured RSSI levels.

7. A method as defined in claim 6, wherein said matrix mapping is used to generate at least one of a co-located membership list, an immediate cell neighbours list and a radio neighbours list of base stations relative to each selected base station.

8. A method as defined in claim 7, wherein radios receiving the strongest RSSI level are placed in said co-located membership list, those radios receiving the second strongest RSSI levels are placed in said immediate cell neighbours list and those receiving the weakest RSSI levels are placed in said radio neighbours list.

9. A method as defined in claim 8, which includes transferring radio control from one cell to another cell based on the received signal of mobility traffic of system users, in the immediate cell neighbours list of that one cell.

10. A method as defined in claim 8, wherein radios are determined to be co-located in the same cell, when each radio measures an RSSI level above a first threshold when said test signal is transmitted at a first low power level.

11. A method as defined in claim 10, wherein radios are determined to be immediate radio neighbours of neighbouring cells when each radio measure RSSI levels above a second threshold, but below said first threshold and wherein the measured RSSI levels for a test signal transmitted at said first low power level differs from the measured RSSI levels for a test signal transmitted at a second higher power by a delta value.

12. A method as defined in claim 11, wherein radios are determined to be radio neighbours in neighboring cells when each radio measures RSSI levels below said second threshold for a test signal transmitted at said second higher power level.

13. A method as defined in claim 10, wherein a contiguous wireless coverage area is provided by scanning said matrix mapping and combining each immediate neighbourhood cell into a cell zone.

* * * * *